United States Patent [19]
Hakoyama et al.

[11] Patent Number: 5,515,287
[45] Date of Patent: May 7, 1996

[54] NAVIGATION DISPLAY APPARATUS FOR COLLISON AVOIDANCE UTILIZING POLYGONAL SAFETY REGIONS AND PREDICTED DANGER AREAS

[75] Inventors: Tadashige Hakoyama; Yoshio Kato; Satoki Maeda; Hideo Yamaguchi; Osamu Yagi, all of Tokyo, Japan

[73] Assignee: Tokimec Inc., Tokyo, Japan

[21] Appl. No.: 397,794

[22] Filed: Mar. 3, 1995

[30] Foreign Application Priority Data

Mar. 8, 1994 [JP] Japan .................................. 6-037259

[51] Int. Cl.⁶ .................................................. B63H 25/00
[52] U.S. Cl. ........................................ 364/461; 364/443
[58] Field of Search .................................. 364/460, 461, 364/443, 462, 449; 340/904, 901, 902, 903; 180/167, 168, 169; 343/7 A, 455, 5 EM

[56] References Cited

U.S. PATENT DOCUMENTS

| | | | |
|---|---|---|---|
| 3,717,873 | 2/1973 | Riggs | 343/5 EM |
| 3,725,918 | 4/1973 | Fleischer et al. | 343/5 EM |
| 3,939,334 | 2/1976 | Roth et al. | 235/156 |
| 4,021,802 | 5/1977 | Litchford | 343/6.5 LC |
| 4,153,935 | 5/1979 | Jones et al. | 364/461 |
| 4,313,115 | 1/1982 | O'Sullivan | 343/5 EM |
| 4,466,068 | 8/1984 | Degré et al. | 364/461 |
| 4,623,966 | 11/1986 | O'Sullivan | 364/461 |

FOREIGN PATENT DOCUMENTS

| | | |
|---|---|---|
| 0020261 | 6/1980 | European Pat. Off. . |
| 5016631 | 6/1975 | Japan . |
| 1505246 | 3/1978 | United Kingdom . |

*Primary Examiner*—Kevin J. Teska
*Assistant Examiner*—Stephen J. Walder, Jr.
*Attorney, Agent, or Firm*—David O'Reilly

[57] ABSTRACT

A navigation supporting display apparatus makes it easy for an operator of ship to navigate with a safe passing distance between own ship and a target by indicating an exact danger area between own ship and the target ship. The apparatus has a collision point calculator which calculates a possible collision point of each of the vertexes of a polygonal safe passing region set around own ship, and the target ship, from a relative position of the target ship, a velocity vector of the target ship and a velocity of own ship. The apparatus has an own-ship-mapping-position calculator which calculates a position at which own ship would be located when each of the vertexes places on the collision point, and defines the position as a own-ship-mapping-position. The apparatus further has a danger area calculator which determines lines joining own-ship-mapping-positions corresponding to the collision points with each other to define a danger area. The relation between connected own-ship-mapping-positions and the own-ship-mapping-positions are output to a display device, and the display device displays the area defined by the lines joining own-ship-mapping-positions as a danger area together with the position and the vector of own ship and the position of the target ship.

8 Claims, 11 Drawing Sheets

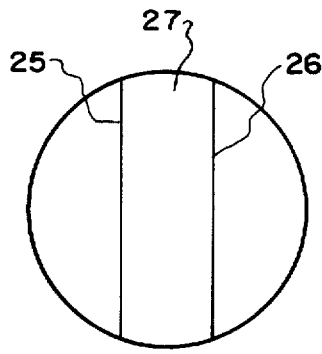
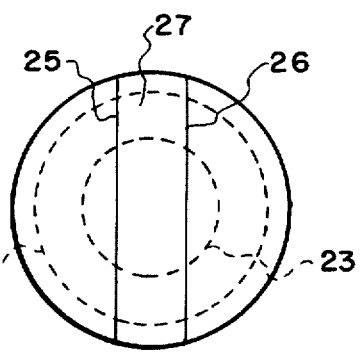
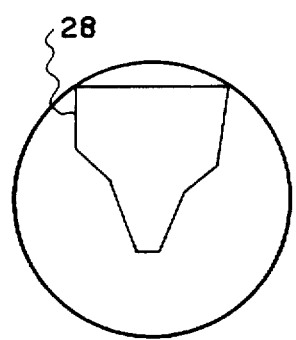
Fig. 19a.　　Fig. 19b.　　Fig. 20.
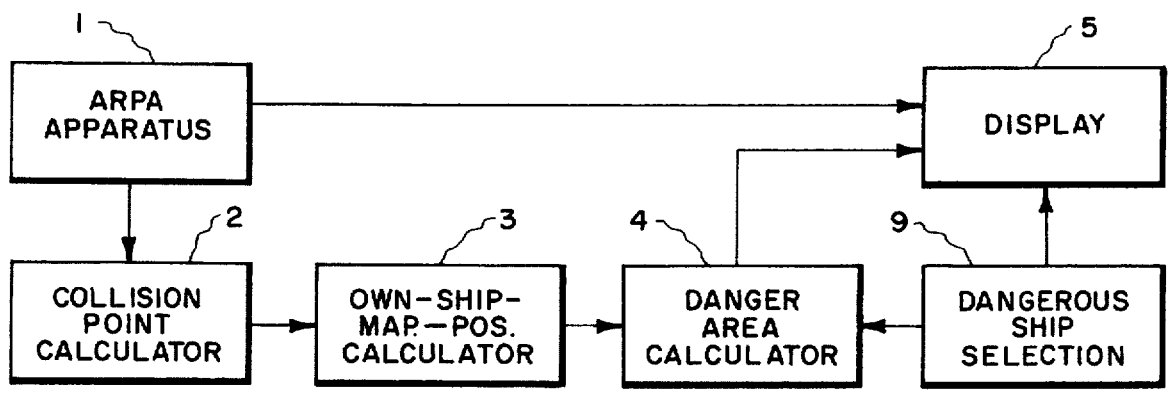
Fig. 21.
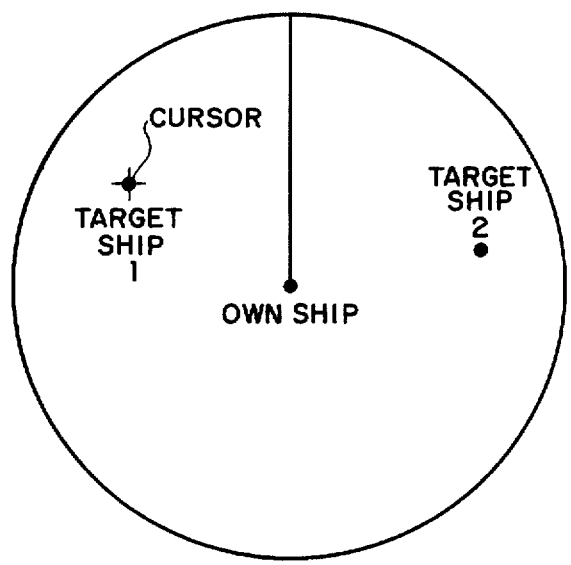
Fig. 22.

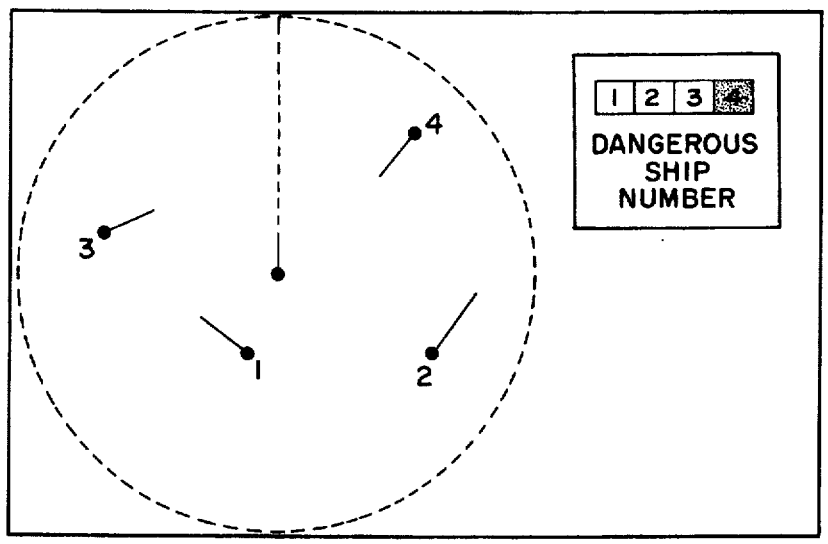
Fig. 23.
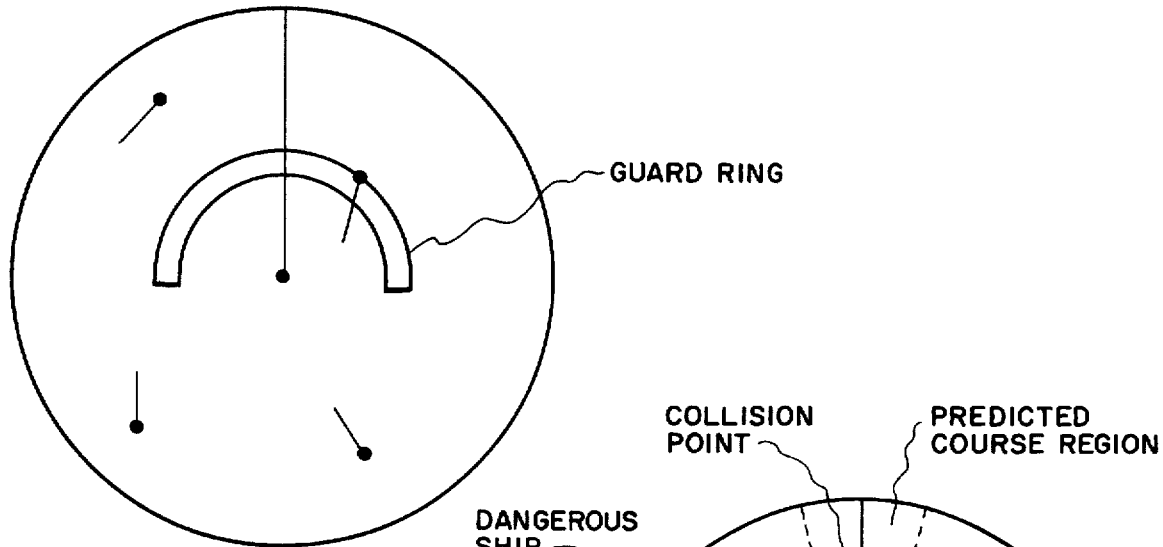
Fig. 24.
Fig. 25.

5,515,287

NAVIGATION DISPLAY APPARATUS FOR COLLISON AVOIDANCE UTILIZING POLYGONAL SAFETY REGIONS AND PREDICTED DANGER AREAS

1. Field of the Invention

The present invention relates to a navigation supporting display apparatus which supports navigation of one's own ship with indicating collision danger areas where there are the dangers of collision between own ship and target ships.

2. Description of the Prior Art

Heretofore, as a navigation supporting display apparatus, the Automatic Radar Plotting Aids (hereinafter, it is referred to as ARPA apparatus) is widely utilized. In ARPA apparatus, image data of target ships selected from the image data of a radar system are tracked, and their kinetic vectors are calculated and displayed on a screen of a display device. The distances of closest point approach (hereinafter, it is referred to as DCPA) between the target ship and one's own ship are determined from the kinetic vectors, etc.. When the distance becomes smaller than the criterion, an alarm is given. In such an apparatus, a ship's operator knows the risk of collision of his own ship with a target ship only when his own ship keeps its heading. However, this ARPA apparatus does not provide any information as to what maneuvers the operator should take to avoid risk of collision.

Therefore, to eliminate the above disadvantages, a system disclosed in Japanese Patent Publication 51-32475 (U.S. Pat. No. 3,717,873) and a system disclosed Japanese Patent Publication 51-37158 (U.S. Pat. No. 3,725,918) were proposed. The former system indicates a circle around a probable collision point of own ship and target ship as a probable collision region. The region represents an area of uncertainty as to the probable collision point. The latter system indicates an ellipse on a predicted track of a target ship as a probable collision region. The major diameter for the ellipse represents a course range that own ship would pass the target ship with less than a minimum passing distance along the predicted tack or the target ship. The minor diameter for the ellipse is twice the minimum passing distance along a perpendicular line to the predicted track of the target ship.

However, in the former system, since the indicated probable collision region is not related to a passing distance between own ship and the target ship, even if a ship operator navigates his vessel so as to avoid the indicated probable collision region, the ship does not necessarily pass the target ship keeping a safe passing distance.

In the latter system, since the probable collision regions are indicated in order to be used for determining an avoiding route, in fact, the indicated collision regions are not a true collision danger area but a larger region than the true collision danger area. Accordingly, in the overcrowding sea area, the indicated regions associated with a plurality of target ships complicatedly overlap with each other so that the judgment on an avoiding route is difficult. Further since the indicated probable collision region does provide accurate information on only dangerous heading range but does not provide accurate information on a collision danger area, it cannot assist an operator maneuvering a ship by setting way points (hereinafter it is referred as WP).

SUMMARY OF THE INVENTION

It is an object of the present invention to provide a navigation supporting display apparatus which facilitates an operator of own ship (i.e., the navigation ship) to easily navigate a ship while keeping a safe passing distance from a target ship and to avoid selecting a dangerous course, by displaying an exact collision danger area.

A navigation supporting display apparatus according to the present invention comprises a collision point calculation means mapping position calculating means and danger area calculating means. The collision point calculation means calculates a possible collision point of each vertex of a polygonal safe passing region set around own ship, and a target ship, from the relative position of the target ship, the velocity vector of the target ship and the velocity of own ship.

The mapping position calculating means (hereinafter own-ship-mapping-position calculating means) calculates a position at which own ship would be located when a position each of the vertexes places on the collision point obtained by the collision point calculation means, and for defining the calculated position as a own-ship-mapping position, and The danger area calculation means is for determining lines joining the own-ship-mapping-positions corresponding to the possible collision point of the vertexes of the safe passing region, said lines defining a danger area, and for outputting informations on the lines and own-ship-mapping-positions to display means, whereby said apparatus supports the ship navigation by providing the danger area where there is the danger of collision between own ship and a target ship.

Further the navigation supporting display apparatus according to the present invention may comprise display means which receives the information on the lines joining the own-ship-mapping-positions and on the own-ship-mapping-position from the danger area calculation means, and displays an area defined by the lines joining own-ship-mapping-positions as a danger area together with the position and vector of own ship and the position of the target ship.

In the navigation supporting display apparatus according to the present invention, at least one of two points of contact of two tangential lines drawn from the target ship to a circle which centers at a position of own ship and has a radius corresponding to a safe passing distance may be one of the vertexes of the polygonal safe passing region.

In the navigation supporting display apparatus according to the invention, the danger area calculation means may determine the lines joining the own-ship-mapping-positions depending on the number of the possible collision points of each of the vertexes of the safe passing region as follows, i) in a case where each of the vertexes has one or no collision point, respectively, the danger area calculation means determines lines in such a manner that the own-ship-mapping-positions corresponding to the collision points corresponding to the vertexes neighboring each other are connected with each other by one of the lines, so that the lines define a closed danger area, or one or more open danger area(s);

ii) in a case where each of the vertexes has two collision points, the danger area calculation means judges which one of the two collision points needs longer time to move from the present vertex's position to the collision point, and which one of the two collision point needs shorter time to move from the present vertex's position to the collision point, classifies one of the two collision points needing longer time into a longer group and the other of the two collision points needing shorter time into a shorter group, and determines lines in such a manner that the own-ship-mapping-positions corresponding to the collision points belonging to the longer group and corresponding to the vertexes neighboring each other are connected with each other by one of the lines, and determines lines in such a manner that the own-ship-mapping-positions corresponding to the collision points belonging to the shorter group and corresponding to the vertexes neighboring each other are connected with each other by one of the lines so that the lines define two separate danger areas;

iii) in a case where one or some vertex(es) has (have) one collision point and the other vertexes have two collision points, respectively, the danger area calculation means judges, for the other vertexes having two collision points, which one of the two collision points needs longer time to move from the present vertex's position to the collision point, and which one of the two collision point needs shorter time to move from the present vertex's position to the collision point, classifies one of the two collision points needing longer time into a longer group and the other of the two collision points needing shorter time into a shorter group, assuming that, for the vertex(es) having one collision point, the collision point belongs to either groups and determines lines in such a manner that the own-ship-mapping-positions corresponding to the collision points belonging to the longer group and corresponding to the vertexes neighboring each other are connected with each other by one of the lines, and determines lines in such a manner that the own-ship-mapping-positions corresponding to the collision points belonging to the shorter group and corresponding to the vertexes neighboring each other are connected with each other by one of the lines, so that the lines define to form two danger areas contacting with each other; and iv) in the other case where there are vertex(es) having no collision point and vertex(es) having two collision points, the danger area calculation means judges, for the vertex(es) having two collision points, which one of the two collision points needs longer time to move from the present vertex's position to the collision point, and which one of the two collision point needs shorter time to move from the present vertex's position to the collision point, classifying one of the two collision points needing longer time into a longer group and the other of the two collision points needing shorter time into a shorter group, assuming that, if there is(are) a vertex(es) having one collision point, for the vertex(es) having one collision point, the collision point belongs to either groups and determines lines in such a manner that the own-ship-mapping-positions corresponding to the collision points belonging to the longer group and corresponding to the vertexes neighboring each other are connected with each other by one of the lines, and determines lines in such a manner that the own-ship-mapping-positions corresponding to the collision points belonging to the shorter group and corresponding to the vertexes neighboring each other are connected with each other by one of the lines, if neighboring vertex has no collision points, two own-ship-mapping-positions corresponding to the two collision points corresponding to a vertex which neighbors with the vertex having no collision points are connected with each other by one of the lines, so that the lines define two danger areas overlapping with each other.

Further, in the navigation supporting display apparatus according to the present invention, the danger area calculation means may output the information to the display means in such a manner that the case where the danger areas are overlapping each other can be discriminated from the other cases.

Further the navigation supporting display apparatus according to the present invention may comprise dangerous course range calculation means for calculating a dangerous course range which defines courses which make own ship pass through the danger area, and dangerous course confirmation means for outputting an alarm signal when a setting course of own ship is within the dangerous course range.

Further the navigation supporting display apparatus according to the present invention may comprise dangerous course range calculation means for calculating a dangerous course range which defines courses which make own ship pass an area between the two separate danger areas related to a target ship, and dangerous course confirmation means for outputting an alarm signal when a setting course of own ship is within the dangerous course range.

Further the navigation supporting display apparatus according to the present invention may comprise noticeable region setting means for setting a noticeable region to be used on judging a risk of collision, wherein said danger area calculation means gives instructions to the display means to change the way a danger area is displayed according to whether at least a part of the danger area is located within the noticeable region.

Further the navigation supporting display apparatus according to the present invention may comprise dangerous ship selection means for selecting a dangerous ship from among target ships, wherein said danger area calculation means gives instructions to the display means to change the way a danger area is displayed according to whether the danger area is related to the dangerous ship.

According to the present invention, collision points of each vertex of a safe passing region set around own ship are obtained, and the positions of own ship when positions of vertexes coincide with the collision points of the vertexes are obtained and are defined as own-ship-mapping-positions. The obtained own-ship-mapping-positions are connected with each other by lines to form a danger area(s) which is(are) defined by the connected lines.

The danger areas obtained according to the present invention show a condition of the sea area when a target ship will intrude into the safe passing region of own ship in the future. Therefore, an operator of ship can determine a course of own ship with avoiding the danger areas, or set WP so that he can easily navigate with keeping a safe distance from the target ship.

BRIEF DESCRIPTION OF THE DRAWINGS

In the drawings:

FIGS. 19(a), 19(b) are views showing examples of setting of noticeable areas in a fifth embodiment;

FIG. 20 is a view for showing an example of a setting of noticeable area in a fifth embodiment;

FIG. 21 is a block diagram of a sixth embodiment of a navigation supporting display apparatus according to the present invention;

FIG. 22 is a view showing an example of setting of a dangerous ship in a sixth embodiment;

FIG. 23 is a view showing an example of setting of a dangerous ship in a sixth embodiment;

FIG. 24 is a view showing an example of setting of a dangerous ship in a sixth embodiment;

FIG. 25 is a view showing an example of setting of a dangerous ship in a sixth embodiment;

DETAILED DESCRIPTION OF THE PREFERRED EMBODIMENTS (First Embodiment)

Figure 1:
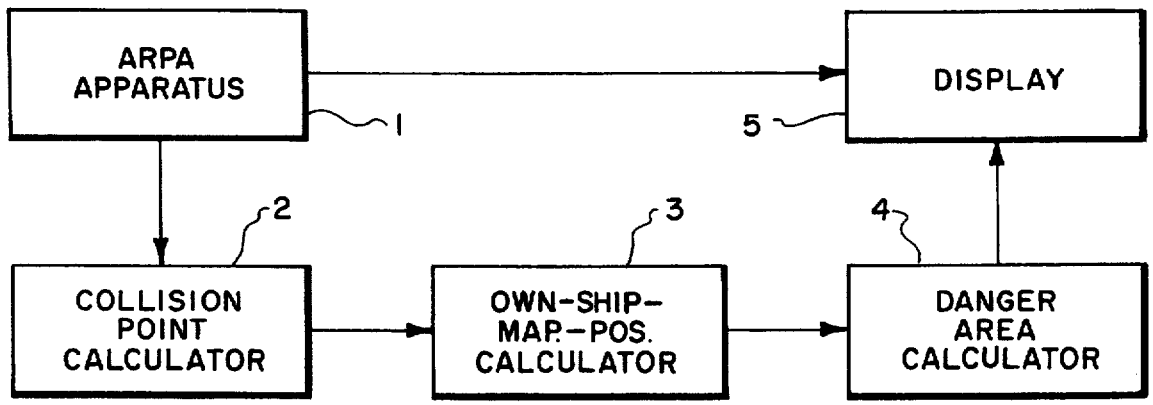
FIG. 1 is a block diagram of a first embodiment of a navigation supporting display apparatus according to the present invention.

Referring to the drawings, an embodiment of the present invention is explained. FIG. 1 is a block diagram of an embodiment of a navigation supporting display apparatus.

The present apparatus, which is combined with a conventional ARPA apparatus 1, is comprised of collision point calculator 2, own-ship-mapping-position calculator 3, danger area calculator 4 and display device 5.

In ARPA apparatus 1, a target ship is automatically detected and tracked from radar video signals supplied from a radar system (not shown in the figure), a position, and a velocity vector of a target ship are estimated, and past positions and the velocity vector of the target ship are displayed on display device 5. At the same time, a position and a velocity vector of own ship, which are obtained from signals supplied from a GPS receiver, a gyrocompass, and a speed log and others (not shown in the figure are displayed on display device 5. The respective information on the position and the velocity vector of a target ship, and the position and the velocity vector of own ship are hereinafter referred to as the ARPA information.

Collision point calculator 2 determines a possible collision point of each vertex of a polygonal safe passing region set around own ship, and a target ship from information on the relative position and velocity vector of the target ship and on a velocity of own ship.

Own-ship-mapping-position calculator 3 calculates positions where own ship would be located when a position of each of the vertexes of the safe passing region places on the collision points obtained by collision point calculator 2 and defines the calculated positions as own-ship-mapping-positions.

Danger area calculator 4 determines lines joining the own-ship-mapping-positions obtained by own-ship-mapping-position calculator 3 to define a danger area, and outputs information on the lines and the own-ship-mapping-positions to display device 5.

Display device 5 indicates an area defined by the lines joining the own-ship-mapping-positions based on the information on the lines and the positions of own-ship-mapping-positions supplied from danger area calculator 4. The display device 5 can be included as a component of the apparatus according to the present invention, however, alternatively, the display device 5 can be omitted from the components of the apparatus according to the present invention when another display device equipped in conventional ARPA apparatus is used.

Figure 2:
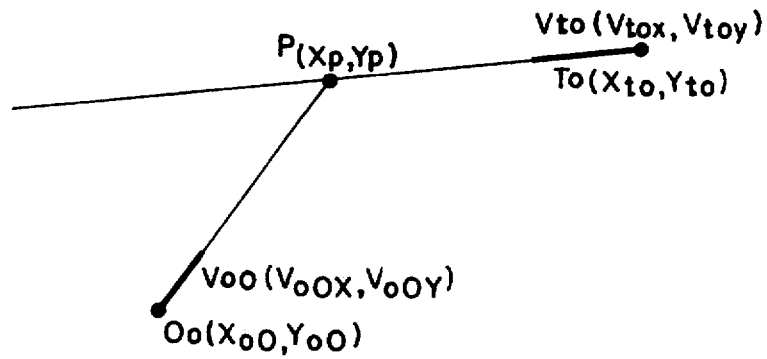
FIG. 2 is an explanatory view showing a possible collision point of own ship with a target ship.

FIG. 2 shows an example where the ARPA information are indicated on a screen of display device. To begin with, a method of calculating a possible collision point of own ship and a target ship is explained for understanding the present invention..

In the figure, $O_0(X_{o0}, Y_{o0})$ represents a position of own ship in X-Y coordinates, $T_0(X_{t0}, Y_{t0})$ represents a position of the target ship, and $V_{t0}(V_{t0x}, V_{t0y})$ represents a velocity vector of the target ship.

We assume that the target ship does not change the course and the velocity thereof, while own ship changes only the course thereof. Now supposing that a velocity vector of own ship is $V_{o0}(V_{o0x}, V_{o0y})$ when own ship takes a course, a position of own ship after time t, $O(t)(X_0(t), Y_0(t))$, and a position of the target ship after time t, $T(t)(X_t(t), Y_t(t))$, are expressed by the following equations:

$$O(t): \quad X_0(t) = X_{o0} + V_{o0x} \cdot t \qquad (1)$$

$$Y_0(t) = Y_{o0} + V_{o0y} \cdot t$$

$$T(t): \quad X_t(t) = X_{t0} + V_{t0x} \cdot t \qquad (2)$$

$$Y_t(t) = Y_{t0} + V_{t0y} \cdot t$$

Since a possible collision point of own ship and target ship, $P(X_p, Y_p)$, is a point at which $O(t)$ coincides with $T(t)$, X and Y components of the velocity vector of own ship having a possible collision point with the target ship are expressed by following equations (3) which are derived from that the right side of equation (1) is set equal to the right side of equation (2) for each of X and Y components.

$$V_{o0x} = V_{t0x} + \frac{X_{t0} - X_{o0}}{t} \qquad (3)$$

$$V_{o0y} = V_{t0y} + \frac{Y_{t0} - Y_{o0}}{t}$$

Then, since a velocity of own ship $V_0$ is unchangeable, the following equation (4) is always maintained.

$$V_{o0x}^2 + V_{o0y}^2 = V_o^2 \qquad (4)$$

Time required for own ship to move from the present, position thereof to a possible collision point with the target ship can be calculated by solving the quadratic equation for t, the quadratic equation obtained by substituting equation (3) into equation (4), and the time t is expressed as follows, $$t = \frac{-(XV_{t0x} + YV_{t0y}) \pm \sqrt{(XV_{t0x} + YV_{t0y})^2 - (V_{t0x}^2 + V_{t0y}^2 - V_o^2)(X^2 + Y^2)}}{V_{t0x}^2 + V_{t0y}^2 - V_o^2} \qquad (5)$$

where $X=(X_{t0}-X_{o0})$ and $Y=(Y_{t0}-Y_{o0})$.

Collision point $P(X_p, Y_p)$ can obtained by substituting t of equation (5) into equation (2).

$$X_P = X_{t0} + \frac{-(XV_{t0x} + YV_{t0y}) \pm \sqrt{(XV_{t0x} + YV_{t0y})^2 - (V_{t0x}^2 + V_{t0y}^2 - V_o^2)(X^2 + Y^2)}}{V_{t0x}^2 + V_{t0y}^2 - V_o^2} \cdot V_{tox} \qquad (6)$$

$$Y_P = Y_{t0} + \frac{-(XV_{t0x} + YV_{t0y}) \pm \sqrt{(XV_{t0x} + YV_{t0y})^2 - (V_{t0x}^2 + V_{t0y}^2 - V_o^2)(X^2 + Y^2)}}{V_{t0x}^2 + V_{t0y}^2 - V_o^2} \cdot V_{toy}$$

Collision point calculator 2 of the present embodiment determines possible collision points of each of the vertexes of a safe passing region (reference numeral "9" in FIG. 3) set around own ship.

The safe passing region is a region in which collision is likely to occur when the target ship intrudes into the region. Preferably, the safe passing region is a circle centering own ship having a radius corresponding to a safe passing distance. However, in the present invention, the safe passing region is set a polygon approximating to a circle. A polygon can more clearly approximate a circle by increasing the number of vertexes, however an arbitrary polygon (a hexagon in an example shown in FIG. 3) can be chosen. Further, this shape is not restricted to a regular polygon. If it is desired to keep a larger distance for starboard-side passing than for port-side passing, the region can be set in such a manner that the starboard-side zone becomes wider. Further, the allowable closest distance set in the ARPA apparatus can be applied as a safe passing distance. Otherwise an operator can set any distance. The number of vertexes and the safe passing distance can be fixed or variable. X,Y coordinates of vertexes $E_i$ $(X_{ie0}, Y_{ie0})$(i=1, 2, ... , n) of n-polygon are represented by $X_{ie0}=X_{o0}+r_i\cos\theta_i$, $Y_{ie0}=Y_{o0}+r_i\sin\theta_i$, where $r_i$ is a distance of from own ship to i-th vertex and $\theta_i$ is an angle between a line connecting own ship with i-th vertex and X axis.

To obtain a possible collision point $P_i(X_{ip}, Y_{ip})$ (i=1, 2, ..., n) of vertexes $E_i(X_{ie0}, Y_{ie0})$ (i= 1, 2, ... , n) of the safe passing region, and target ship $T_0$, $E_i(X_{ie0}, Y_{ie0})$ are substituted for own ship position in equation (6) on the assumption that the safe passing region does not change with time. In this way, collision points can be calculated for each of the vertexes.

The number of collision points calculated for each of the vertexes differs depending on the velocity ratio of own ship to the target ship and the relative position of the target ship relative to the vertexes. Namely, it differs depending on the number of solutions satisfying t>0 in equation (5).

The number of collisions are classified as follows.

a) When a target ship is slower than own ship, always one collision point b) When a velocity of a target ship is same as velocity of own ship,
   If $X_iV_{t0x}+Y_iV_{t0y}<0$, one collision point
   If $X_iV_{t0x}+Y_iV_{t0y}>=0$, no collision point c) When a target ship is faster than own ship.
   If D>0 and $X_iV_{t0x}+Y_iV_{t0y} <0$, two collision points If D=0 and $X_iV_{t0x}+Y_iV_{t0y} <0$, one collision point
   If D<0, no collision point where D is a discriminant of the quadratic equation for t obtained by substituting equations (3) into equation (4), and D, $X_i$, and $Y_i$ are expressed as follows.

$$D=4\{(X_iV_{t0x}+Y_iV_{t0y})^2-(V_{t0x}^2+V_{t0y}^2-V_o^2)(X_i^2+Y_i^2)\} \qquad (7)$$

$$X_i=X_{t0}-X_{ie0}$$

$$Y_i=Y_{t0}-Y_{ie0} \qquad (8)$$

The number of collision points is intuitionally understood by the following. Namely, as to the case a), since own ship moves faster than the target ship, a course in which own ship overhauls the target ship always exists. As to the case b) of no collision point, since a velocity of own ship and a velocity of the target ship are the same, when the target ship runs off from own ship, own ship cannot overhaul the target ship, and as to the case c) of two collision points, since the target ship moves faster that own ship, there are two cases where the target ship collides with own ship from the front thereof and where the target ship collides with own ship from the back thereof.

Collision point calculator 2 can determine a collision point(s) of own ship and the target ship as well as a collision point(s) of each of the vertexes and the target ship.

Own-ship-mapping-position calculator 3 then calculates positions at which own ship would be located when a position of each vertex Ei coincides with collision point Pi obtained in collision point calculator 2, the calculated positions referred as own-ship-mapping-positions, Qi(Xiq, Yiq). Supposing that the relative position of the vertex Ei of the safe passing region relative to own ship is unchanged and they move in parallel to each other, Qi(Xiq, Yiq) can be obtained by the following equations.

$$X_{iq} = X_{ip} - r_i \cdot \cos\theta_i$$

$$Y_{iq} = Y_{ip} - r_i \cdot \sin\theta_i \quad (9)$$

Figure 3:
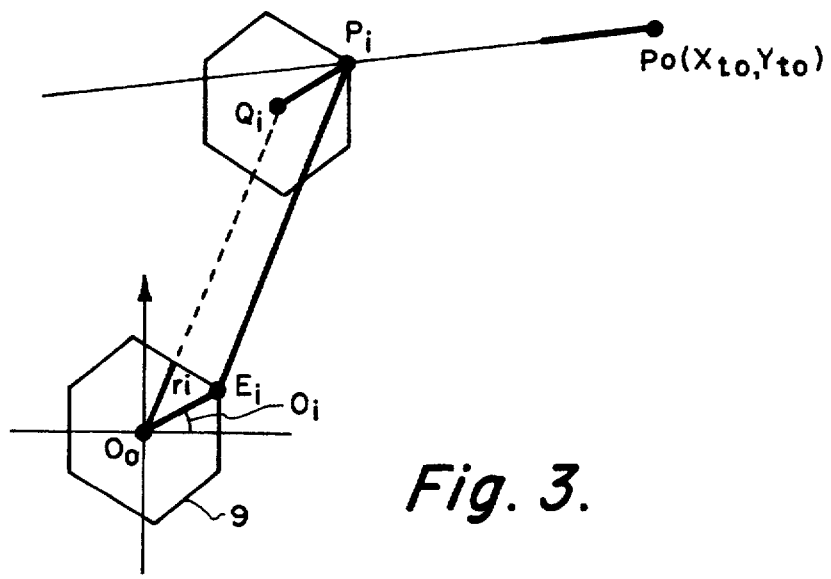
FIG. 3 is an explanatory view showing a polygonal safe passing region set around own ship and the collision point of a vertex of the polygon safe passing region with the target ship.

As is apparent from FIG. 3, point Qi provides a boundary point at which target ship To can pass own ship without intruding into the safe passing region of own ship. In this way, own-ship-mapping-positions can be obtained for each of the vertexes.

Figure 4:
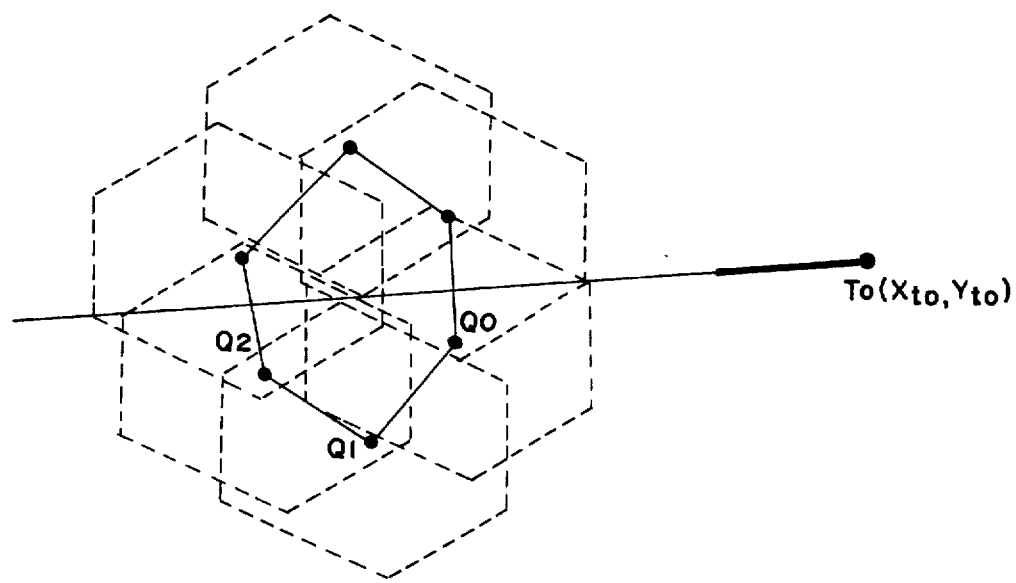
FIG. 4 is an explanatory view showing a danger area.

Then, danger area calculator 4 connects the own-ship-mapping-positions Qi (i=1, 2, ... , n) corresponding to the individual collision points Pi (i=1, 2, ... , n) with each other one by one to form a closed region (see FIG. 4).

If the vertexes neighboring with each other have a collision point, the own-ship-mapping-positions corresponding to the collision points corresponding to the vertexes neighboring each other are connected with each other by a line. However, the number of danger areas also differs depending on the number of collision points of each vertex of the safe passing region obtained by collision points calculator 2, and the number of danger areas are classified as follows.

a) When a target ship is slower than own ship, always one danger area.

b) When a target ship has the same velocity as that of own ship, one or no danger area.

c) When a target ship is faster than own ship, one or two or no danger area(s).

Accordingly, danger area calculator 4 determines how to connect the own-ship-mapping-positions depending on the velocity ratio of the target ship and the number of collision points Pi corresponding to each vertex Ei of the safe passing region.

a) and b) When a velocity of the target ship is lower than or the same as that of own ship.

In these cases, only when the vertexes neighboring with each other respectively have a collision point, own-ship-mapping-positions corresponding to the collision points of the vertexes are connected with each other by a line. If all the vertexes have collision points, an obtained danger area becomes a closed area. However, if a vertex having no collision point exists, a danger area becomes an open area.

c) When a velocity of the target ship is higher than that of own ship

In this case, depending on the number of collision points corresponding to each vertex of the safe passing region, there are further the following three cases:

case i) where two danger areas are separate;

case ii) where two danger areas contact with each other; and case iii) where two danger areas overlap with each other, namely it looks as if only one danger area exists.

Each case is explained in detail hereinafter.

Case i) where two danger areas are separate

When each vertex of the safe passing region has two collision points with a target ship, times required to move from the present vertex's position to the two collision points are respectively measured. Depending on the time required, the respective two collision points of each vertex of the safe passing region are classified into two groups in such a manner that one of the two collision points at which it needs longer time to arrive belongs to a longer group and the other of the two collision points at which it needs shorter time to arrive belongs to a shorter group. Own-ship-mapping-positions corresponding to the collision points belonging to the longer group and corresponding to the vertexes neighboring with each other are connected with each other by a line. Similarly, own-ship-mapping-positions corresponding to the collision points belonging to the shorter group and corresponding to the vertexes neighboring with each other are connected with each other by a line. As a result, two separate closed areas are obtained, one of which is associated with the longer group and the other of which is associated with the shorter group. Respective two collision points mean there are two solutions in equation (5) corresponding to the signs + and − in the numerator of equation (5).

Case ii) where two danger areas contact each other

When a vertex or some vertexes of the safe passing region has (have) one collision point and the other vertexes have two collision points, the two collision points of the other vertexes are classified into a longer group and a shorter group in the same manner as case i). Own-ship-mapping-positions corresponding to the collision points belonging to the longer group and corresponding to the vertexes neighboring with each other are connected with each other by a line. Own-ship-mapping-positions corresponding to the collision points belonging to the shorter group and corresponding to the vertexes neighboring with each other are connected with each other by a line. As to the vertex(es) having one collision point, supposing that one collision point of the vertex(es) belongs to both groups, the own-ship-mapping-position corresponding to the one collision point of the vertex is connected with the own-ship-mapping-positions corresponding to the two collision points of the vertex neighboring with the above vertex(es).

In this case, the maximum number of vertexes having one collision point is two in principle.

Figure 6A:
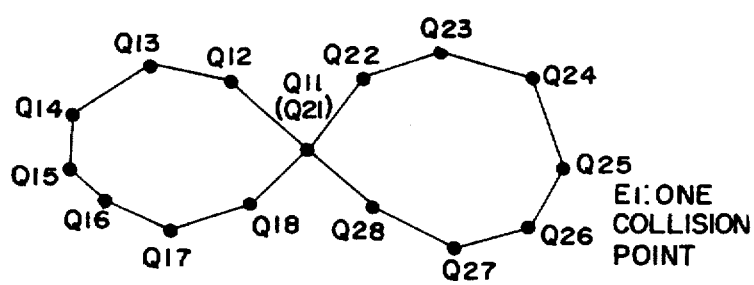
FIGS. 6(A), 6(B) are views showing danger areas defined by lines, wherein two danger areas contact each other.

FIG. 6(A) shows an example of this. In FIG. 6(A), it is assumed that only vertex $E_1$ has one collision point. $Q_{1i}$ and $Q_{2i}$ (i=1, , , , 8) represent own-ship-mapping-positions corresponding to collision points of vertex Ei (i=1, ... , 8) and a target ship, where $Q_{1i}$ represents own-ship-mapping-position corresponding to the collision point belonging to the shorter group, and $Q_{2i}$ represents own-ship-mapping-position corresponding to the collision point belonging to the longer group. Assuming that own-ship-mapping-position $Q_{11}$ corresponding to vertex E1 belongs to both groups, own-ship-mapping-positions corresponding to neighbour vertexes are connected with each other by lines. As a result four points $(Q_{12}, Q_{22}, Q_{18}, Q_{28})$ and $Q_{11}(=Q_{21})$ are connected with each other to form two closed areas which are in contact with each other at one point.

Figure 6B:
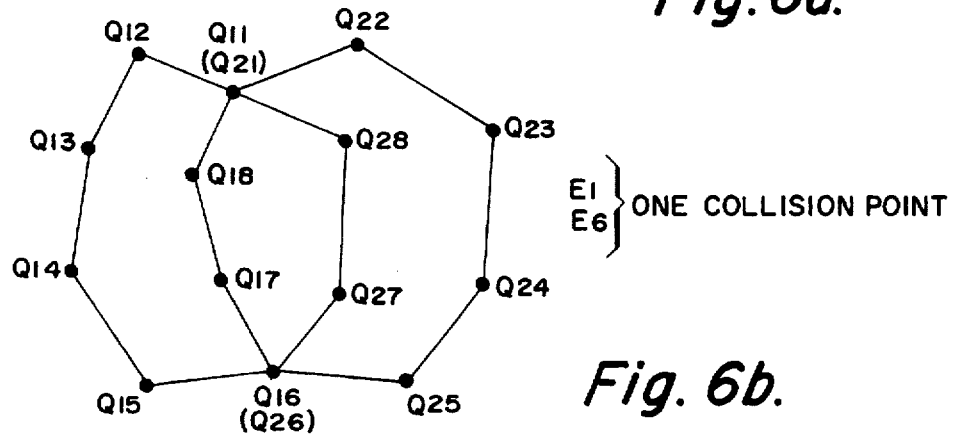

FIG. 6(B) shows an example in which there are two vertexes having one collision point. In FIG. 6(B), it is assumed that vertexes $E_1$ and $E_6$ have one collision point, respectively. Assuming that both own-ship-mapping-position $Q_{11}$ corresponding to vertex $E_1$ and own-ship-mapping-position $Q_{16}$ corresponding to vertex $E_6$ belong to both groups, own-ship-mapping-positions corresponding to neighbour vertexes are connected with each other by lines so that four points $(Q_{12}, Q_{22}, Q_{18}, Q_{28})$ and $Q_{11}(=Q_{21})$ are connected with each other by lines and four points ($Q_{15}$, $Q_{25}$, $Q_{17}$, $Q_{27}$) and $Q_{16}(=Q_{26})$ are connected with each other by lines to form two closed areas which contact each other at two points.

Case iii) where two danger areas overlap with each other

In cases other than the above-mentioned case i) and case ii), two danger areas overlap each other so that danger area is indicated as one area. If vertexes having no collision point exist among all the vertexes $E_i$ of the safe passing region, as to other vertexes having two collision points, the two collision points are classified into a longer group and a shorter group in the same way as case i). Own-ship-mapping-positions corresponding to the collision points belonging to the longer group and corresponding to the vertexes neighboring with each other are connected with each other by a line, and own-ship-mapping-positions corresponding to the collision points belonging to the shorter group and corresponding to the vertexes neighboring with each other are connected with each other by a line. In a case where a vertex having only one collision point exists, it is assumed to belong to both groups, and own-ship-mapping-position corresponding to the one collision point is connected with own-ship-mapping-position corresponding to the collision point corresponding to the neighboring vertex.

On connecting own-ship-mapping-positions in accordance with the above rules, if a neighbour vertex has no collision points, own-ship-mapping-positions corresponding to two collision points of the vertex are connected with each other.

Figure 7A:
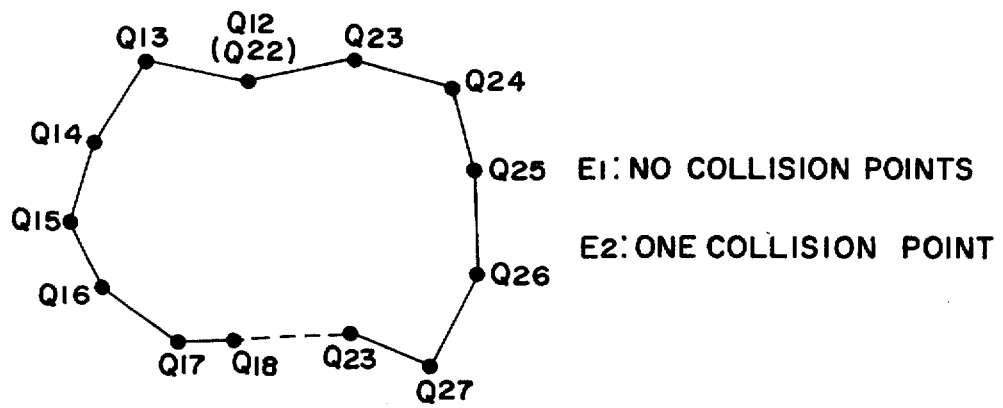
FIGS. 7(A), 7(B) and 7(C) are views showing danger areas defined by lines, wherein two danger areas overlap each other.
Figure 7B:
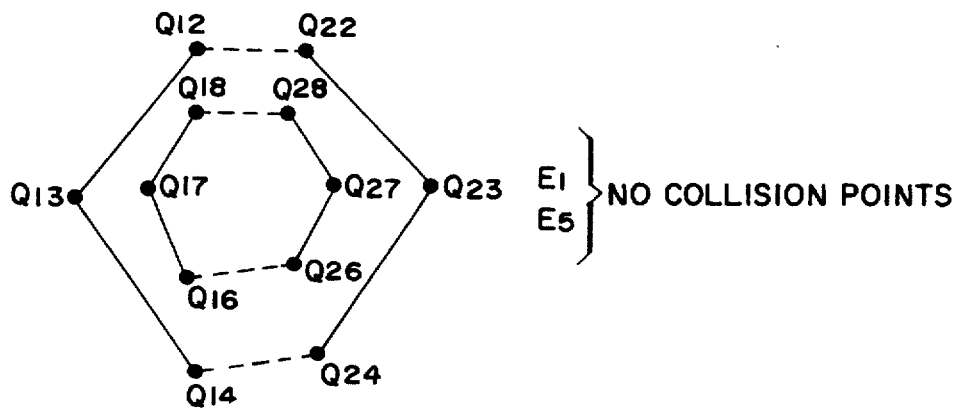
Figure 7C:
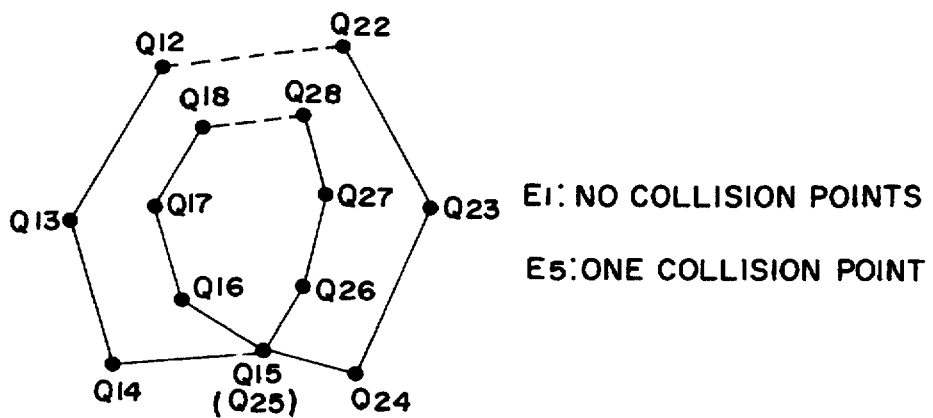

FIGS. 7(A), 7(B), 7(C) show some examples. FIG. 7(A) shows a case where vertex $E_1$ has no collision point. Though vertex $E_2$ and/or $E_6$ can have only one collision point, it is assumed that only vertex $E_2$ has one collision point in this case.

Since $Q_{12}$ is supposed to belong to both groups, $Q_{12}$ is connected with adjacent own-ship-mapping-positions $Q_{13}$ and $Q_{23}$, which belong to the different groups. Further, since there is no own-ship-mapping-position adjacent to $Q_{18}$ and $Q_{28}$ except $Q_{17}$ and $Q_{27}$, $Q_{18}$ and $Q_{28}$ are connected with each other.

FIG. 7(B) shows a case where vertex $E_1$ and $E_5$ have no collision point and the other vertexes have two collision points, respectively. $Q_{12}$ and $Q_{22}$, $Q_{18}$ and $Q_{28}$, $Q_{14}$ and $Q_{24}$, $Q_{16}$ and $Q_{26}$ are connected with each other, respectively.

FIG. 7(C) shows a case where vertex $E_1$ has no collision point, and vertex $E_5$ has one collision point. In this case, since $Q_{15}$ is thought to belong to both groups, $Q_{15}$ is connected with $Q_{14}$, $Q_{24}$, $Q_{16}$ and $Q_{26}$. Further, since there is no own-ship-mapping-position adjacent to $Q_{12}$, $Q_{22}$, $Q_{18}$ and $Q_{28}$ except $Q_{13}$, $Q_{23}$, $Q_{17}$ and $Q_{27}$, $Q_{12}$ and $Q_{22}$, and $Q_{18}$ and $Q_{28}$ are connected with each other, respectively.

In all cases shown in FIGS. 7(A) to 7(C), one closed area is formed.

Figure 27:
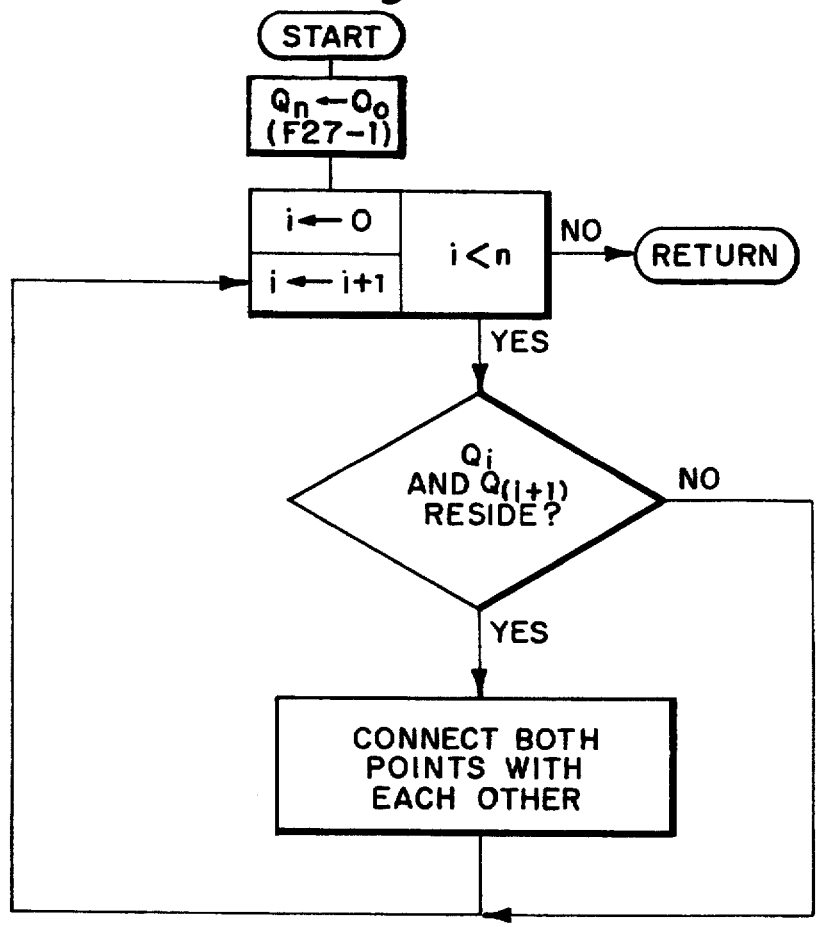
FIG. 27 is a flowchart of a danger area calculator.
Figure 28:
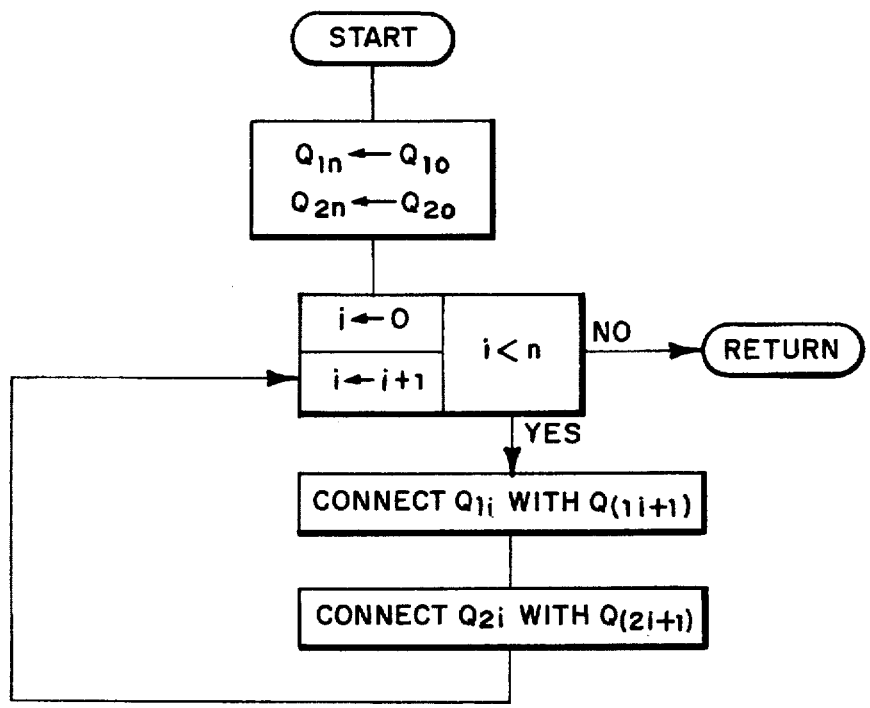
FIG. 28 is a flowchart of a danger area calculator.
Figure 29:
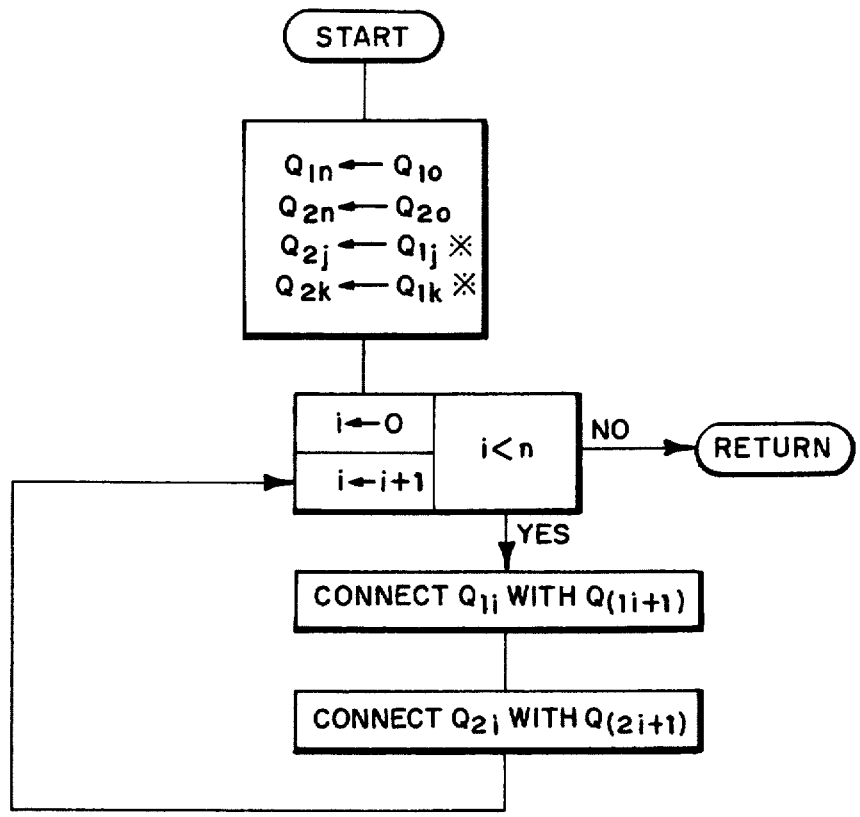
FIG. 29 is a flowchart of a danger area calculator.
Figure 30:
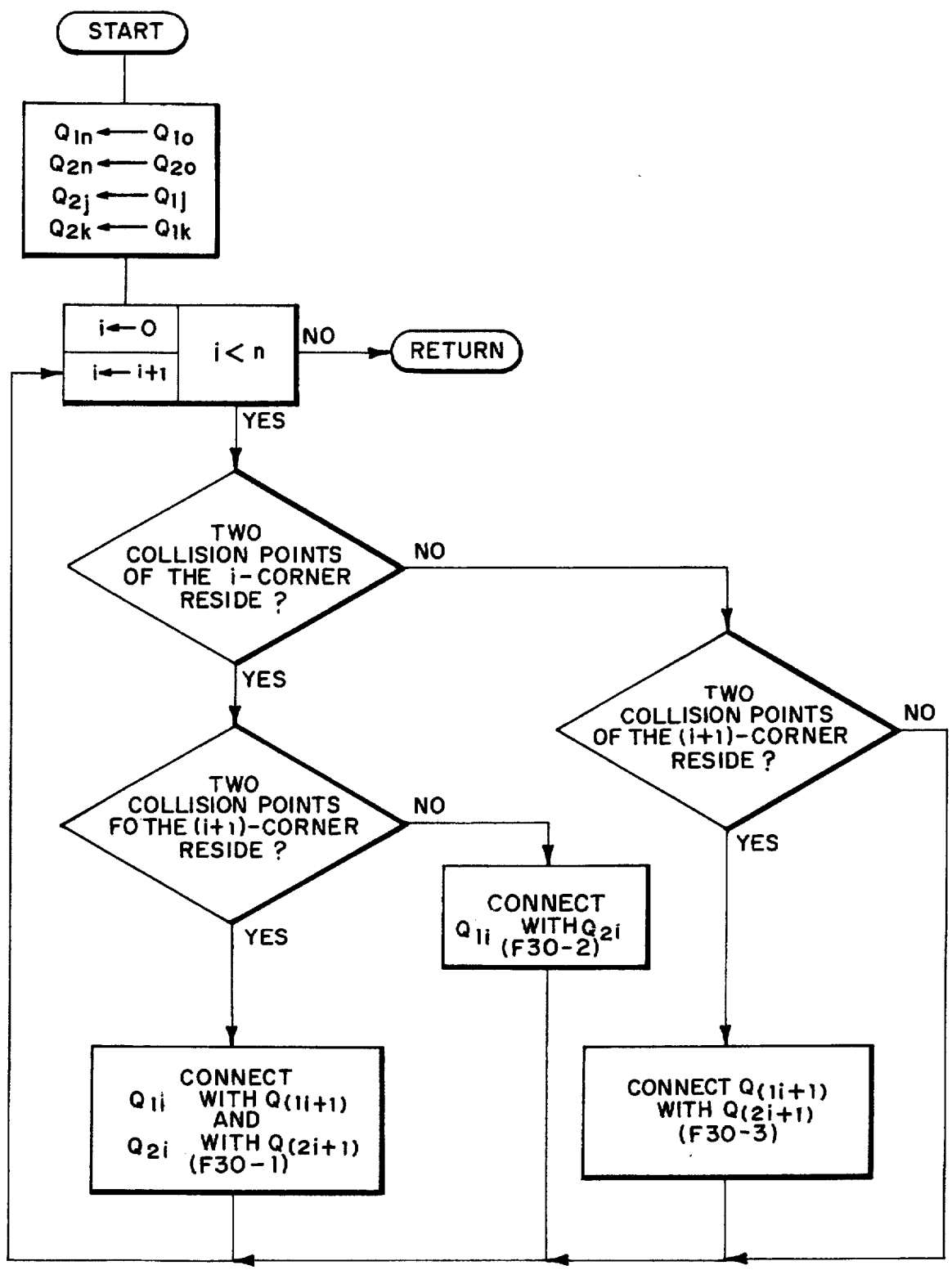
FIG. 30 is a flowchart of a danger area calculator.

Danger area calculator 4 determines the relation of connection between own-ship-mapping-positions according to the above-mentioned rules, and teaches it to display device 5. FIGS. 27 to 30 are flowcharts showing processes to determine the relation of connection between own-ship-mapping-positions in danger area calculator 4 and to determine a danger area for a target ship. When a velocity of a target ship is less than or the same as a velocity of own ship, the steps shown in FIG. 27 are carried out, and when a velocity of a target ship is more than a velocity of own ship, depending on the number of collision points, one of processes shown in FIGS. 28 to 30 are carried out. Namely, FIG. 28 shows the process when all vertexes have two collision points, respectively. FIG. 29 shows the process of when a vertex(es) has(have) one collision point and the remaining vertexes have two collision points, respectively, and FIG. 30 shows the process of when a vertex(es) has(have) no collision point.

Danger area calculator 4 checks the number of collision points which each vertex has, then selects a suitable process from among the above processes.

In FIG. 27, $Q_n=Q_0$ is set since a safe passing region has the shape of closed n-polygon and own-ship-mapping-position corresponding to the 0-th vertex is the same as own-ship-mapping-position corresponding to the n-th vertex (F27-1 shown in FIG. 27), then, own-ship-mapping-positions corresponding to 0-th vertex through the (n−1)-th vertex are connected with own-ship-mapping-position corresponding to the neighbour vertexes. If there is no neighbour own-ship-mapping-position, the step is forwarded without connection.

In FIG. 28, after the classification (into $Q_{1i}$ and $Q_{2i}$) is carried out, then neighbour own-ship-mapping-positions are connected with each other.

In FIG. 29, after the classification is carried out, supposing that own-ship-mapping-positions corresponding to vertexes having only one collision point belong to both groups (see the step X in the flowchart shown in FIG. 29), neighbour own-ship-mapping-positions are connected with each other.

In FIG. 30, the classification is carried out, supposing that own-ship-mapping-positions corresponding to vertexes having only one collision point, if they exist, belong to both groups, in the same manner as in FIG. 29. When there is(are) collision point(s) of the i-th vertex and there is (are) collision point(s) of the number (i+1)-th vertex, neighbour own-ship-mapping-positions ($Q_{1i}$ and $Q_{1i+1}$, and $Q_{2i}$ and $Q_{2i+1}$) are connected with each other for each group (F30-1). When there is no collision point for (i+1)-th vertex, own-ship-mapping-positions corresponding to two collision points of i-th vertex are connected with each other (F30-2). When there is no collision point for i-th vertex, own-ship-mapping-positions corresponding to two collision points of (i+1)-th vertex are connected with each other (F30-3). In the cases F 30-2 and F30-3, if i-th vertex or (i+1)-th vertex has only one collision point, steps F30-2 and F30-3 joins a line between the same own-ship-mapping-positions, which causes no problems supposing the line having no length.

In display device 5, danger areas are displayed according to informations on own-ship-mapping-positions and the relation of connection between own-ship-mapping-positions sent from danger area calculator 4 together with the ARPA informations from ARPA apparatus 1 and radar images.

Figure 5:
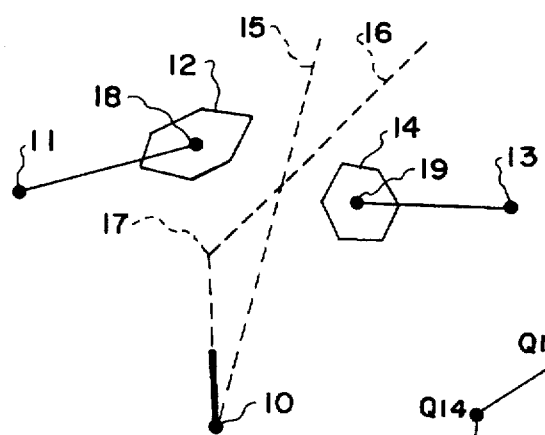
FIG. 5 is an explanatory view showing an example of an image displayed on a screen of a display device.

FIG. 5 shows an example of an image displayed on the screen of display device. In FIG. 5, numeral 10 designates a position of own ship, numerals 11 and 13 designate positions of target ships, numerals 12, 14 designate danger areas associated with target ships 11, 13, respectively. An operator of own ship selects a new route designated by course 15 which avoids danger areas 12, 14, or sets WP 17 to select course 16 as a new route which avoids a danger area so that he can maneuver a ship keeping a safe passing distance between the target ship and own ship. In FIG. 5, terminal points 18, 19 of segments of line connecting the respective target ships and the corresponding danger areas 12, 14 are collision points of own ship and the respective target ships. Accordingly, these lines are a predicted course of the target ships, and diagrammatically makes the relation between the respective target ships and danger areas clear.

As for terminal points of these lines, besides a collision point between own ship and a target ship, 1) a cross point of a predicted course of a target ship and a danger area, or
2) an arbitrary point within a danger area on a predicted course of a target ship can be alternatively selected.

Further, in FIG. 5, danger areas and segments of a line connecting the danger areas and the target ships are shown by a solid line. Alternatively to distinguish these indications from other information, the following items of these indications may be changed, a) a kind of lines (a solid line, a broken line, and a dotted line)
b) width of line
c) colour
d) flicker
e) others.

Further, only when there is no collision point of a target ship with own ship but a danger area exists, a kind of line between the target ship and the danger area may be changed.

Further, a velocity vector of a target ship, past positions of the target ship and others of the target ship obtained from ARPA apparatus 1 may be displayed together with the above-mentioned informations.

Further, the apparatus can be used as a steering system by displaying danger areas together with radar images and marine charts in which an operator steers a ship, preventing the ship from stranding as well as a collision.

(Second Embodiment)

A second embodiment of a navigation supporting display apparatus according to the present invention is explained hereinafter.

The above-mentioned first embodiment is very useful in indicating a danger area to steer a ship while securely keeping a safe distance with a target ship. However, the first embodiment does not give accurately important informations for steering a ship keeping a safe passing distance on a predicted course of a target ship in front of or behind the target ship, because a safe passing region is arbitrarily set to a polygon around own ship. In the case where a polygon of the safe passing region can approach a circle by increasing the number of vertexes of the polygon of the safe passing region, the above-mentioned two points, that is points on the predicted course in front of and behind a target ship are likely to be included in the vertexes of the polygon, but when the number of vertexes of polygon is small, the two points are likely not to be included in the vertexes of the polygon.

To solve the above problems, in the second embodiment at least one point on a predicted course of a target ship in front of or behind the target ship is included in vertexes of a polygon.

Figure 8:
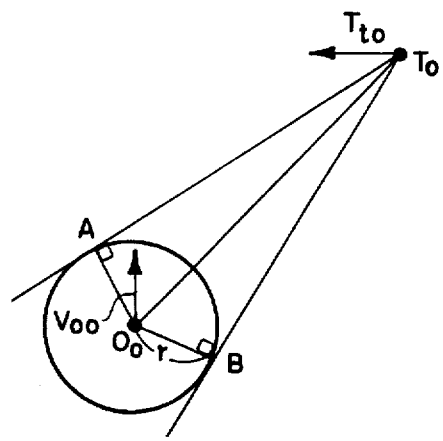
FIG. 8 is an explanatory view of a second embodiment of a navigation supporting display apparatus according to the present invention.

FIG. 8 is an explanatory view showing the principle of the present embodiment. In the figure, a safe passing region is shown as a circle centering the position of own ship $O_0$ and a radius of the circle being safe passing distance r. If an extension of the relative velocity vector of the target ship intersects the circle, the target ship will intrude into the safe passing region. Points A, B designates points of contact of a tangent from the position of target ship $T_0$ to the circle of the safe passing region with the radius r. Points A, B show the boundaries in the direction of the relative velocity vector for the target ship to sail-with keeping a safe distance. Point A corresponds to a point that own ship passes behind the stern of the target ship on the predicted course of the target ship, and point B corresponds to a point that own ship passes in front of the bow of the target ship on the predicted course of the target ship. A method of calculating two points A, B is explained as follows.

Figure 9:
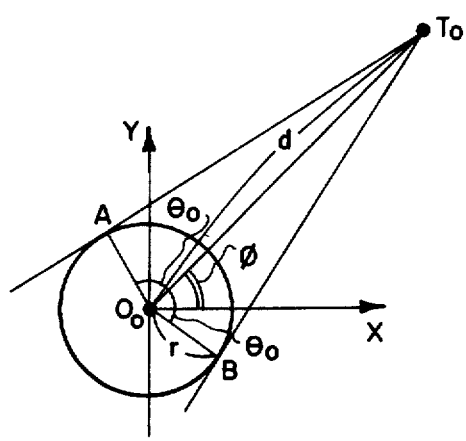
FIG. 9 is an explanatory view of a second embodiment of a navigation supporting display apparatus according to the present invention.

In FIG. 9, the position of own ship is $O_0$ $(X_{o0}, Y_{o0})$, the position of target ship is $T_0(X_{t0}, Y_{t0})$, and the distance between two ships is d. If d>r, the triangle $\Delta T_0 O_0$ A is congruent with the triangle $\Delta T_0 O_0 B$. If setting $<T_0 O_0 A = <T_0 O_0 B = \theta_0$, $\theta_0$ is represented by:

$$\theta_0 = \cos^{-1}\left(\frac{r}{d}\right) \tag{10}$$

Further, if a relative direction of own ship to the target ship is $\phi$, $\phi$ is represented by:

$$\phi = \tan^{-1}\left(\frac{Y_{t0} - Y_{o0}}{X_{t0} - X_{o0}}\right) \tag{11}$$

By obtaining $\theta_0$ and $\phi$ from equations (10), (11), coordinates of two points A, B, $(X_{A0}, Y_{A0})$, and $(X_{B0}, Y_{B0})$ can be derived, $X_{A,B0}$ and $Y_{A,B0}$ being represented by $$X_{A,B0} = X_{o0} + r \cdot \cos(\phi \pm \theta_o)$$

$$Y_{A,B0} = Y_{o0} + r \cdot \sin({}^{SM} \pm \theta_o) \tag{12}$$

Figure 10:
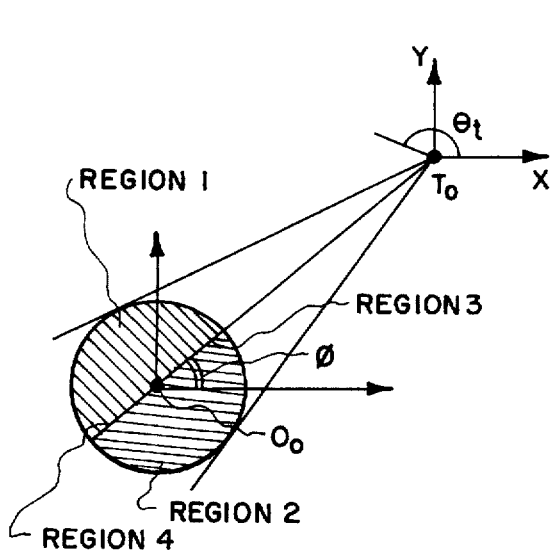
FIG. 10 is an explanatory view of a second embodiment of a navigation supporting display apparatus according to the present invention.

It should be noted that one cannot usually identify which of the obtained two points is a point of passage in front of the bow of the target ship (i.e. point B) and which of the obtained two points is a point of passage behind the stern of the target ship (i.e. point A). These points are identified by course $\theta_t$ of the target ship. A method of identification is explained as follows. As shown in FIG. 10, the circle of the safe passing region is classified into two cases depending on relative direction $\phi$ and the circle is further divided into following regions for each case.

| | |
|---|---|
| 1) When $0 <= \phi < \pi$ | |
| When $\phi < \theta < \phi + \pi$ | region 1 |
| When $0 <= \theta < \phi$ or $\phi + \pi < \theta < 2\pi$ | region 2 |
| When $\theta = \phi$ | region 3 |
| When $\theta = \phi + \pi$ | region 4 |
| 2) When $\pi <= \phi < 2\pi$ | |
| When $\phi - \pi < \theta < \phi$ | region 1 |
| When $0 <= \theta < \phi - \pi$ or $\phi < \theta < 2\pi$ | region 2 |
| When $\theta = \phi$ | region 3 |
| When $\theta = \phi - \pi$ | region 4 |

Setting $\theta_1 = \phi + \theta_0$ and $\theta_2 = \phi - \theta_0$, each of $\theta_1$ and $\theta_2$ belongs to either region 1 or region 2. The positions A and B can be determined according to the region to which course $\theta_t$ of the target ship belongs.

1) When $\theta_t$ belongs to either region 1 or region 2

As apparent from FIG. 8, the direction of point A from own ship belongs to the same region as $\theta_t$. Accordingly, one of $\theta_1$ and $\theta_2$ which belongs to the same region as $\theta_t$ is determined to be point A, and the other is determined to be point B.

2) When $\theta_t$ belongs to region 3 or region 4

Figure 11:
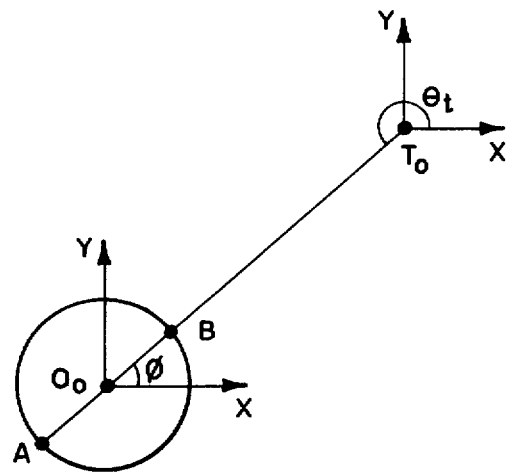
FIG. 11 is an explanatory view of a second embodiment of a navigation supporting display apparatus according to the present invention.

This case happens when the target ship and own ship collide (face) with each other, or when the target ship and own ship move in the same direction (overtake). As shown in FIG. 11, the direction of point B from own ship is $\phi$, and the direction of point A from own ship is $\phi + \pi$, $X_{A0}$, $Y_{A0}$, $X_{B0}$ and $Y_{B0}$ are represented by:

$$X_{A0} = X_{o0} + r \cdot \cos(\phi + \pi)$$

$$Y_{A0} = Y_{o0} + r \cdot \sin(\ + \pi) \tag{13}$$

$$X_{B0} = X_{o0} + r \cdot \cos \phi$$

$$Y_{B0} = Y_{o0} + r \cdot \sin \phi$$

Figure 12A:
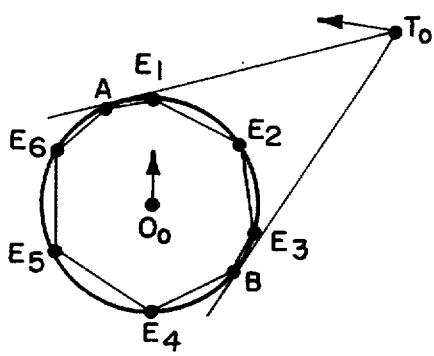
FIGS. 12(A) through 12(D) are respective examples of safe passing regions of a second embodiment.

Collision point calculator 2 sets a polygon of the safe passing region of the present embodiment in a manner that vertexes of the polygon include a point of passage behind the stern of target ship, i.e. point A and a point of passage in front of the bow of target ship, i.e. point B. For example, the polygon is set according to the following methods:

Method 1): a fixed polygon+points A, B (see FIG. 12(A))

Figure 12B:
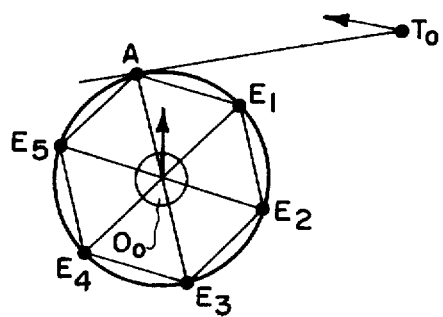

Method 2): a polygon formed by connecting points which divide the circumference of a circle into equal parts starting from a point A, with each other by lines (see FIG. 12(B))

Figure 12C:
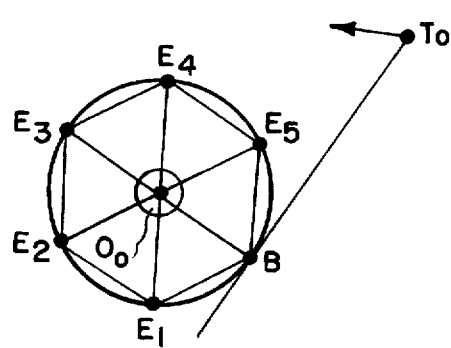

Method 3): a polygon formed by connecting points which divide the circumference of a circle into equal parts starting from a point B, with each other by lines (see FIG. 12(C))

Figure 12D:
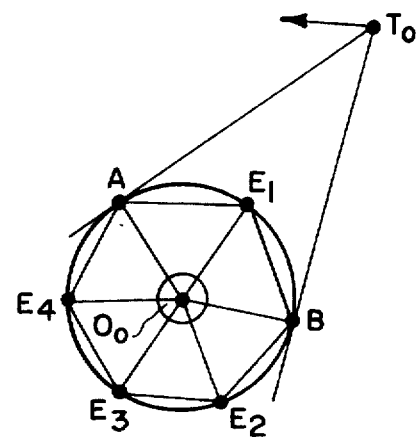

Method 4): a polygon formed by connected points which divide the circumference of a circle into a plurality of parts with a given ratio of circular arc starting from points A and B (see to FIG. 12(D))

Collision point calculator 2 determines collision points of vertexes including points A, B in the same manner as the first embodiment. Further, in own-ship-mapping-position calculator 3, own-ship-mapping-positions corresponding to the collision points are obtained. Danger area calculator 4 determines lines joining the own-ship-mapping-positions with each other, which are sent to display device 5.

Figure 13:
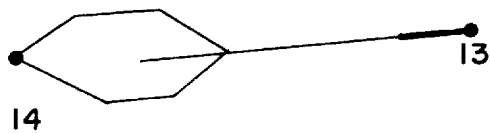
FIG. 13 is an example of an image displayed on a screen of a display device in a second embodiment.

Display device 5 indicates not only danger areas but also own-ship-mapping-positions corresponding to point A of passage behind the stern of target ship and point B of passage in front of the bow of target ship with symbols such as point "." to caution operator's attention to display information. Particularly, since it is not preferable to go across an area in front of the stern of target ship in usual sailing, it is preferable to indicate at least the own-ship-mapping-position(s) corresponding to point B of passage in front of the stern of the target ship, (see to FIG. 13). Any arbitrary symbols can be used for a display.

According to the present embodiment, even if the number of vertexes of the safe passing region is decreased, a range of dangerous direction can be more exactly obtained. Accordingly a range of dangerous direction can be instantaneouly understood so that an avoiding route can be easily determined.

(Third Embodiment)

Now a third embodiment of a navigation supporting display apparatus according to the present invention is explained.

In the first embodiment, the case where two danger areas overlap with each other has been explained. In this case, the danger areas are displayed as one area on display device 5, so that an operator cannot discriminate the case where two danger areas overlap with each other from the case where only one danger area exists.

However the above two cases are essentially quite different from each other because in the former case, own ship cannot pass in front of the bow of the target ship. In other words, whenever own ship passes either side of the area, own ship necessarily passes behind of the stern of the target ship. Accordingly, it is convenient for an operator if the operator can discriminate between these two cases from display device, which can be realized by the present embodiment.

Figure 14A:
FIGS. 14(A), 14(B) are views of a third embodiment of a navigation supporting display apparatus according to the present invention, (A) showing a case where there is originally one danger area, and (B) showing a case where there are two separate danger areas.
Figure 14B:
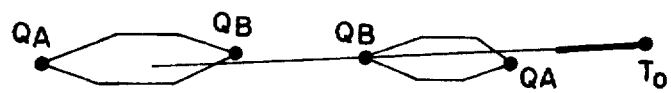

FIGS. 14(A) and 14(B) show the principles of the present embodiment. FIG. 14(A) shows a case where only one danger area exists. In the figure, $Q_A$ and $Q_B$ represent own-ship-mapping-position corresponding to point A of the second embodiment and own-ship-mapping-position corresponding to point B of the second embodiments, respectively. In the case where only one danger area exists, own-ship-mapping-position corresponding to point B necessarily is on a forward side in the direction of the course of the target ship while own-ship-mapping-position corresponding to point A necessarily is on the opposite side to point B. FIG. 14(B) shows a case where there are two separate danger areas. In the danger area formed by the own-ship-mapping-positions corresponding to the collision points belonging to the shorter group, own-ship-mapping-position corresponding to point B necessarily is on a forward side in the direction of the course of the target ship while own-ship-mapping-position corresponding to point A necessarily is on the opposite side to point B, the same as FIG. 14(A). However in the danger area formed by the own-ship-mapping-positions corresponding to the collision points belonging to the longer group, an own-ship-mapping-position corresponding to point A necessarily is on a forward side in the direction of the course of the target ship while an own-ship-mapping-position corresponding to point B necessarily is on the opposite side to point A. Since the case where two danger areas overlap each other is a case where two separate danger areas approach each other and are combined into one, on the analogy of FIG. 14(B), it is understood that two own-ship-mapping-positions corresponding to point A are on both forward end and opposite end of overlapped danger area in the direction of the course of the target ship. Therefore whenever own ship avoids the overlapped danger area, own ship can pass behind of the stern of the target ship.

Danger area calculator 4 according to the present embodiment determines lines joining the own-ship-mapping-positions corresponding to the respective vertexes, and supplies special instructions to display device 5 on the case where two danger areas contact with each other or the case where two danger areas overlap with each other.

Figure 15:
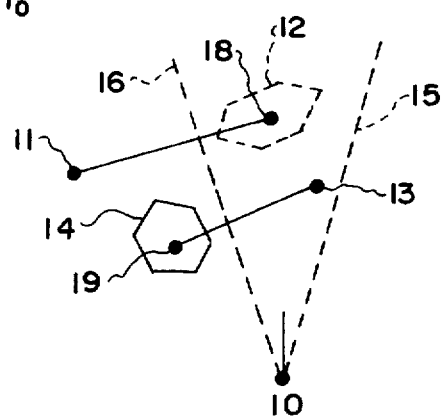
FIG. 15 is a view showing an example of an image displayed on a screen of a display device in a third embodiment.

Display device 5 indicates danger areas with a different symbol in the case where two danger areas contact each other or on the case where two danger areas overlap each other, based on the instructions supplied by danger area calculator 4. FIG. 15 shows an example of this indication. In FIG. 15, area 12 in which two danger area overlap each other is shown by the dotted line. The course of own ship 10 is set to avoid danger areas 12, 14. However, whenever own ship pass through either side of danger area 12, own ship inevitably passes through an area behind the stern of target ship, from which an operator of own ship can easily judge that courses 15, 16 are suitable to avoid risk of collision. Symbols for showing two danger areas can be optionally determined.

According to the present embodiment, an operator can easily understand as to whether a danger area should be avoided considering a side of the area to be passed through or without considering a side of the area to be passed through. Therefore the operator can make instantaneous and appropriate decision on a course and, in particular, the burden of the operator can be lighter even when own ship is sailing in a sea area congested with a lot of ships.

(Fourth Embodiment)

Now a fourth embodiment of a navigation supporting display apparatus according to the present invention is explained.

As explained in the first embodiment, an operator of own ship decides the route or way point (WP) by selecting an avoiding route so as to avoid danger areas. As shown in FIG. 14(A), in the case where there is only one danger area for a target ship, the avoiding route which is not far from the target ship is a course that can pass with a given safe distance from the stern of the target ship, while the danger area avoiding route which is far from the target ship is a course that can pass with a given safe distance from the bow of the target ship, so that a suitable avoiding route can be easily selected. However, in the case where two danger areas occur for one target ship, the above-mentioned relation is reversed for a danger area which is farther from the target ship. Though a previous explanation of the above-mentioned relations can make an operator of ship securely understand it, it is not necessarily expected that the operator can maneuver the ship considering the above-mentioned relations in case of emergency. If the operator of own ship selects a course passing between two danger areas related to a target ship and a velocity of own ship becomes slower, there is a fear that the two areas come nearer and own ship situation can and the target ship become dangerous.

In addition, since many danger areas are shown on a screen of a display device when own ship is sailing in the sea area congested with many ships, the burden of an operator is increased. Therefore, it sometimes becomes difficult for the operator to select a safe course which avoids all danger areas.

The apparatus according to the present embodiment can solve the above problems by alarming an operator of own ship when he sets a course of own ship passing through a danger area, or a course of own ship passing through a zone between two danger areas.

Figure 16:
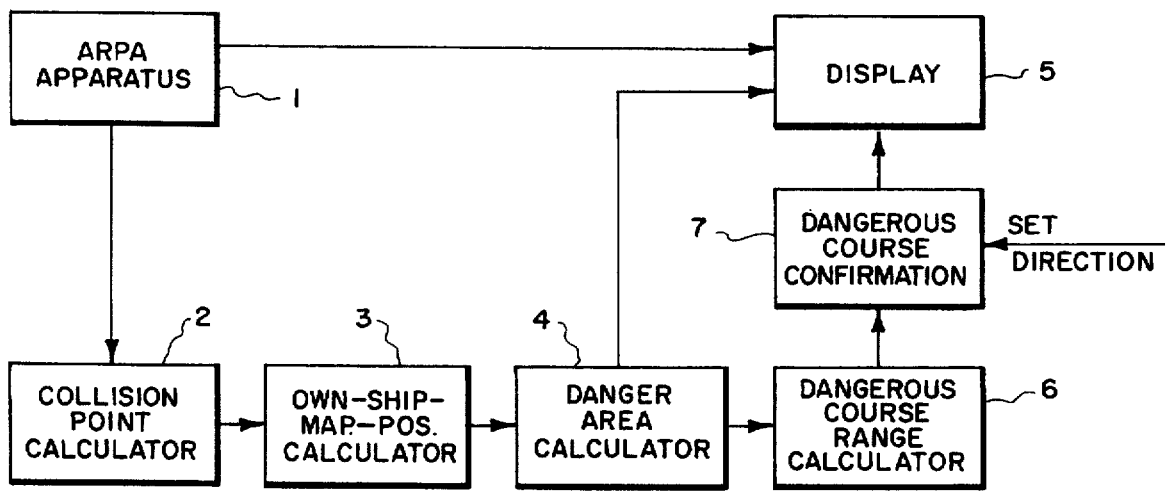
FIG. 16 is a block diagram of a fourth embodiment of a navigation supporting display apparatus according to the present invention.

FIG. 16 is a block diagram of the present embodiment. The apparatus according to the present embodiment further comprises dangerous course range calculator 6 and dangerous course confirmation unit 7 in addition to the calculators of the apparatus according to the previous embodiments.

Dangerous course range calculator 6 obtains informations on own-ship-mapping-position $Q_A$ ($X_{Aq}$, $Y_{Aq}$) corresponding to a point A of passage behind the stern of target ship, own-ship-mapping-position $Q_B$ ($X_{Bq}$, $Y_{Bq}$) corresponding to a point B of passage in front of the bow of target ship, and the number of danger areas from danger area calculator 4 and determines a dangerous course range.

In the case where there is one danger area related to a target ship, azimuth angle $\psi_A$ from the position of own ship $O_0$ ($X_{o0}$, $Y_{o0}$) to own-ship-mapping-position $Q_A$, and azimuth angle $\psi_B$ from the position of own ship $0_0$ ($X_{o0}$, $Y_{o0}$) to own-ship-mapping-position $Q_B$ are expressed as follows;

$$\phi_A = \tan^{-1}\left(\frac{Y_{Aq} - Y_{o0}}{X_{Aq} - X_{o0}}\right) \quad (14)$$

$$\phi_B = \tan^{-1}\left(\frac{Y_{Bq} - Y_{o0}}{X_{Bq} - X_{o0}}\right)$$

A range defined between $\psi_A$ and $\psi_B$ is a dangerous course range.

In the case where there are two danger areas related to a target ship, azimuth angles $\psi_{A1}$ and $\psi_{A2}$ from the position of own ship $O_0$ ($X_{o0}$, $Y_{o0}$) to own-ship-mapping-position $Q_{A1}$, $Q_{A2}$ corresponding to the respective points $A_1$, $A_2$ of passage behind the stern of target ship are expressed as follows;

$$\phi_{A1} = \tan^{-1}\left(\frac{Y_{A1q} - Y_{o0}}{X_{A1q} - X_{o0}}\right) \quad (15)$$

$$\phi_{A2} = \tan^{-1}\left(\frac{Y_{A2q} - Y_{o0}}{X_{A2q} - X_{o0}}\right)$$

A range defined between $\psi_{A1}$ and $\psi_{A2}$ is a dangerous course range.

Dangerous course confirmation unit 7 obtains an information on a setting course of own ship from a course setting apparatus or way point setting apparatus of an auto pilot apparatus and compares the setting course with the dangerous course ranges for all the target ships determined by dangerous course range calculator 6. When the set course is within the dangerous course ranges, a warning signal is output to display device 5 or other warning device. As for the warning, sounding an alarm, showing a warning message on a screen of display device 5, or changing a colour of the danger area, changing a kind of line defining the danger area, flickering the danger area or others can be utilized.

Further, in a modified embodiment of the fourth embodiment, an alarm signal may be output to the display device only when an operator sets a course which directs an area between two danger areas when there are two danger areas related to a target ship.

Namely, in the case where there are two danger areas related to a target ship, azimuth angles $\psi_{B1}$ and $\psi_{B2}$ from the position of own ship $O_0$ ($X_{o0}$, $Y_{o0}$) to own-ship-mapping-positions $Q_{B1}$, $Q_{B2}$ corresponding to the respective points $B_1$, $B_2$ of passage in front of the bow of target ship are calculated by danger course range calculator 6 in accordance with the following equations;

$$\phi_{B1} = \tan^{-1}\left(\frac{Y_{B1q} - Y_{o0}}{X_{B1q} - X_{o0}}\right) \quad (16)$$

$$\phi_{B2} = \tan^{-1}\left(\frac{Y_{B2q} - Y_{o0}}{X_{B2q} - X_{o0}}\right)$$

A range defined between $\psi_{B1}$ and $\psi_{B2}$ is a dangerous course range.

Dangerous course confirmation unit 7 obtains information on a setting course of own ship from a course setting apparatus or way point setting apparatus an auto pilot apparatus and compares the setting course with the dangerous course ranges determined by dangerous course range calculator 6. When the set course is within the dangerous course range, a warning signal is output to display device 5 or other warning device.

In such a way, according to the fourth embodiment, the apparatus supports an operator safely maneuvering a ship by giving an alarm when he selects dangerous courses.

Further, the fourth embodiment has an advantages that the occurrence of two danger areas associated with a target ship can be instantaneously known.

(Fifth Embodiment)

Now a fifth embodiment of a navigation supporting display apparatus according to the present invention is explained.

In the above-mentioned embodiments, all danger areas are usually shown in the same level of notice. Therefore in a sea area congested with many ships, it is difficult for an operator of the ship to easily decide an appropriate avoiding route from indications of the display device, because a lot of danger areas are shown everywhere on a screen of the display device.

19

The fifth embodiment solves the above problems by setting a noticeable region and an unnoticeable region.

Figure 17:
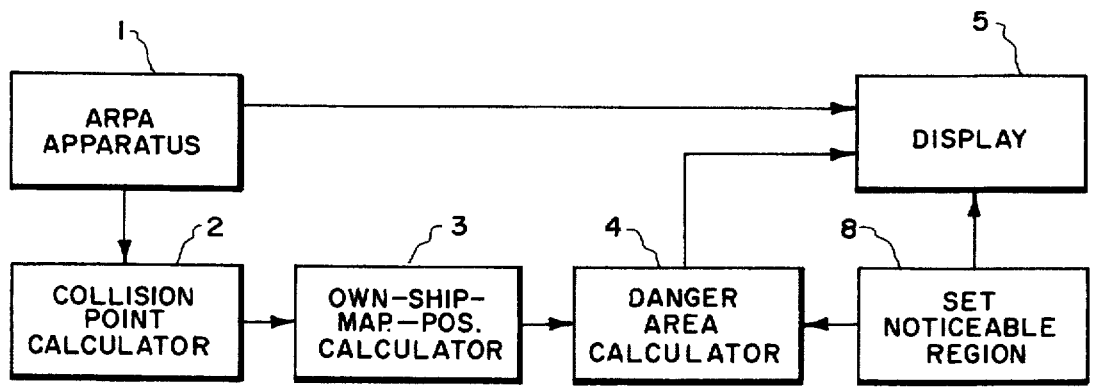
FIG. 17 is a block diagram of a fifth embodiment of a navigation supporting display apparatus according to the present invention.

FIG. 17 is a block diagram of the present embodiment, which further comprises noticeable region setting unit 8.

In noticeable region setting unit 8, a sea area to be noticed on judging a risk of collision is set. The setting of noticeable region is done as follows.

1) Setting of noticeable region by a direction cursor

Figure 18A:
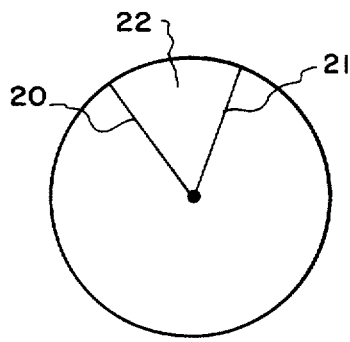
FIGS. 18(a), 18(b) are views showing examples of setting of noticeable areas in a fifth embodiment.
Figure 18B:
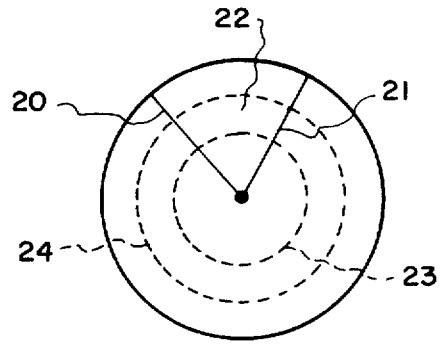

As shown in FIGS. 18(A), 18(B), starting direction 20 and terminal direction 21 are set by using a direction cursor which is usually used for measuring a direction of from own ship to a target ship. In general, it is desirable that these directions are set around the heading of own ship with considering most possible direction in which own ship is navigated, or to which own ship can turn. Alternatively, more than one noticeable region can be set, in particular two regions may be set on the bow side and on the stern side of own ship.

Region starting distance 23 and region terminal distance 24 are additionally set to the above noticeable region by using a distance cursor which is usually used for measuring a distance of from own ship to a target ship. In this way, the noticeable region can be defined by distance and direction.

2) Setting noticeable region by a parallel cursor

As shown in FIGS. 19(A), 19(*b*), a region bounded by two parallel cursors 25, 26 which can be kept in an arbitrary distance and in an arbitrary direction around the position of own ship is set as noticeable region 27. Region starting distance 23 and region terminal distance 24 are additionally set to the above noticeable region by using a distance cursor which is usually used for measuring a distance of from own ship to a target ship. In this way, the region is restricted in distance.

3) Setting of noticeable region by designating vertexes of a polygon

As shown in FIG. 20, noticeable region 28 is defined in the shape of an arbitrary polygon by setting positions of respective vertexes of the polygon one by one.

Information on a noticeable region set in noticeable region setting unit 8 are supplied through danger area calculator 4 to display device 5 together with information on own-ship-mapping-positions and the lines joining own-ship-mapping-positions with each other. In display device 5, a danger area is displayed in a different way depending on whether at least a part of the danger area is within the noticeable region or not, as follows.

1) Decision depending on the positions of a vertexes of danger area

If at least one of the respective vertexes forming a danger area, that is, own-ship-mapping-positions resides in the noticeable region, the danger area is indicated with a different symbol. As for ways for changing a symbol, the following items can be changed.

a) a kind of line (a solid line, a broken line, and a dotted line)
 b) width of line
 c) colour
 d) flicker
 e) others.

2) masking outside a noticeable region

A portion except a noticeable region is masked so that danger areas within the noticeable region are indicated without masking, while a danger area outside the noticeable region is indicated through a mask. Though masking, for example, a symbol of a danger area may be shown with a broken line, or a symbol of danger area may be erased, or colour of indication may be changed.

20

In such a way, according to the fifth embodiment, because danger areas within a noticeable region are distinguished in a sea area congested with many ships, danger areas within the noticeable danger area can be easily known from among many danger areas. Accordingly, since unnecessary information on deciding a safe course is eliminated, the burden of a an operator of ship is decreased so that it becomes easy to decide a safe course.

(Sixth Embodiment)

Now a sixth embodiment of a navigation supporting display apparatus according to the present invention is explained.

The present embodiment provides a navigation supporting display apparatus in which, in particular, danger areas related to dangerous ships can be easily distinguished, to accomplish the same object as the fifth embodiment.

FIG. 21 is a block diagram of the present embodiment. The present embodiment further comprises dangerous ship selection unit 9.

Dangerous ship selection unit 9 selects dangerous ships depending on dangerous degrees of the respective target ships. In dangerous ship selection unit 9, the following operations can be arbitrarily made:

1) An operator of own ship determines degrees of danger for target ships and selects dangerous ships from among the target ships based on the degrees of danger for the target ship, and teaches the dangerous ships to dangerous ship selection unit 9;

2) Dangerous ship selection unit 9 calculates degrees of danger for target ships, and an operator of own ship selects dangerous ships from among the target ships based on the degrees of danger for the target ships;

3) Dangerous ship selection unit 9 both calculates degrees of danger for target ships, and selects dangerous ships from among the target ships based on the degrees of danger for the target ships. If necessary, dangerous ship selection unit 9 may inform an operator of own ship of the dangerous ships selected:

In cases 1) or 2), an operator of own ship sets a dangerous ship by designating a dangerous ship with a cursor from a radar window or other window of display device 5 (see FIG. 2), or by designating numbers of dangerous ships from a radar window or other window of display device 5 (see FIG. 23), or by designating numbers of dangerous ships through a keyboard or other numerical value information transmitting means, or by designating numbers of dangerous ships through a voice input unit.

Figure 26:
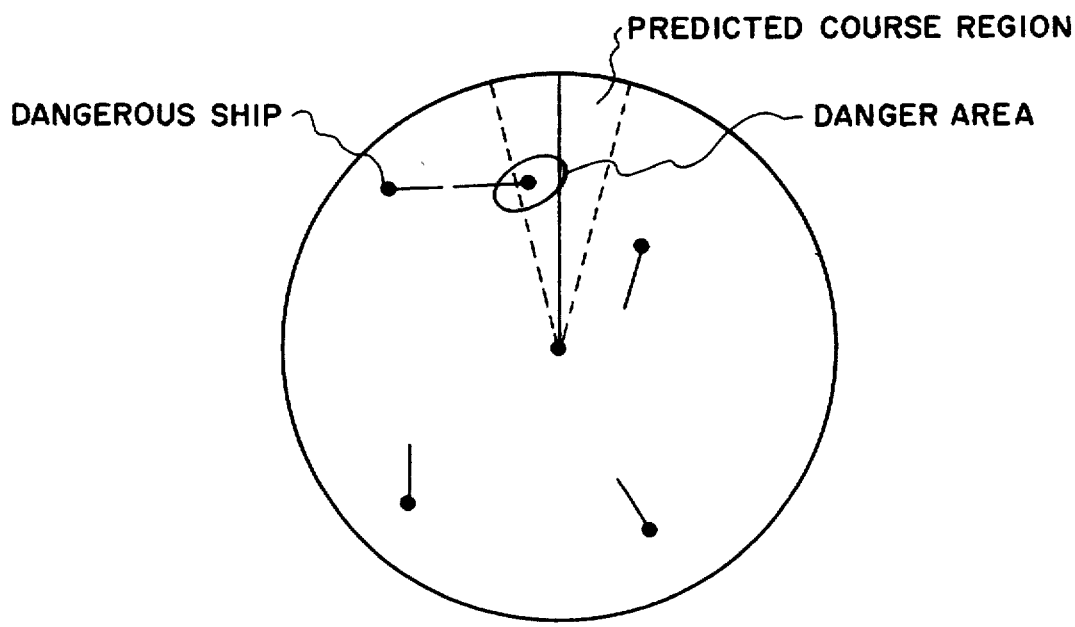
FIG. 26 is a view showing an example of setting of a dangerous ship in a sixth embodiment.

A dangerous ship is selected from among target ships according to the following examples; DCPA for targets ships or TCPA (Time to closest point approach) may be used as the degree of danger for target ships. If value of DCPA or TCPA for a target ship is less than a criterion, the target ship may be selected as a dangerous ship. Otherwise a guard ring is set in the same manner as noticeable regions as shown in FIGS. 18(A), 18(B) and 19(A), and 19(B), and a target ship in the region may be selected as a dangerous ship (see FIG. 24). Otherwise if there is a collision point of own ship with a target ship on a planned course of own ship or on a planned course region of own ship, the target ship may be selected as a dangerous ship (see to FIG. 25). Otherwise if there is a danger area of own ship with a target ship on a planned course of own ship or on a planned course region of own ship (see to FIG. 26). Otherwise a few target ships on the order of having the smallest DCPA or TCPA may be selected as dangerous ships. Any other method can be applied to select dangerous ships from among targets ships.

Information on dangerous ships selected in dangerous ship selection unit 9 are supplied through danger area calculator 4 to display device 5 together with informations on the relation of own-ship-mapping-positions connected by lines and own-ship-mapping-positions and they are indicated on a screen of display device 5. Informations on dangerous ships selected in dangerous ship selection unit 9 are displayed, for example, as follows:

1) Danger areas of dangerous ships alone are indicated, while danger areas of target ships except dangerous ships are not indicated;
2) Danger areas of all the targets are indicated, in which a symbol of danger areas of dangerous ships is changed from a symbol of danger areas of target ships except dangerous ships; and others. As a way to change symbols, the following are given, for example;
    a) a kind of line (a solid line, a broken line, and a dotted line)
    b) width of line
    c) colour
    d) flicker
    e) others.

In this way, according to the sixth embodiment, because danger areas of dangerous ships are indicated to be easily distinguished from other danger areas, in the sea area congested with many ships, noticeable danger areas can be easily understood from among many danger areas of target ships. Accordingly, since unnecessary informations are decreased, a burden on an operator of a ship is decreased so that it becomes easy for him to decide a safe course.

What is claimed is:

1. A navigation supporting display apparatus comprising;
   collision point calculation means for calculating a possible collision point of each vertex of a polygonal safe passing region set around one's own navigating ship, and a target ship, from the relative position of the target ship, the velocity vector of the target ship and the velocity of the navigating ship;

own-ship-mapping-position calculation means for calculating a position at which the navigating ship would be located when each of the vertexes of the safe passing region is on the possible collision point obtained by the collision point calculation means, and for defining the calculated position as an own-ship-mapping position; and danger area calculation means for calculating and determining lines joining the own-ship-mapping-positions corresponding to the possible collision point of the vertexes of the safe passing region, said lines defining a danger area, and output information on the lines and own-ship-mapping-positions to display means, said danger area calculation means determining the lines joining the own-ship-mapping-positions depending on the number of the possible collision points of each vertex of the safe passing region as follows, i) when the vertexes have one or no collision points, respectively, the danger area calculation means determining lines such that the own-ship-mapping-positions corresponding to the collision points corresponding to the vertexes neighboring each other are connected with each other by one of the lines, so that the lines define a closed area, or one or more open areas;

ii) when the vertexes have two collision points, the danger area calculation means judging which one of the two collision points need a longer time to move from the present vertex's position to the collision point, and which one of the two collision points need a shorter time to move from the present vertexes position to the collision point, classifying one of the two collision points needing longer time into a longer time group and the other of the two collision points needing shorter time into a shorter time group, and determining lines such that the own-ship-mapping-positions corresponding to the collision points belonging to the longer group and corresponding to the vertexes neighboring each other are connected with each other by one of the lines, and determining lines such that the own-ship-mapping-positions corresponding to the collision points belonging to the shorter time group and corresponding to the vertexes neighboring each other are connected with each other by one of the lines so that the lines define two separate danger areas:

iii) when one or more vertexes have one collision point and the other vertexes have two collision points, respectively, the danger area calculation means judging, for the other vertexes having two collision points, which one of the two collision points needs a longer time to move from the present vertex's position to the collision point, and which one of the two collision points needs a shorter time to move from the present vertex's position to the collision point, classifying one of the two collision points needing a longer time into a longer time group and the other of the two collision points needing a shorter time into a shorter time group, assuming that, for vertexes having one collision point, the collision point belongs to either group and determining lines such that the own-ship-mapping-positions corresponding to the collision points belonging to the longer group and corresponding to the vertexes neighboring each other are connected with each other by one of the lines, and determining lines such that the own-ship-mapping positions corresponding to the collision points belonging to the shorter time group and corresponding to the vertexes neighboring each other are connected with each other by one of the lines, so that the lines define and form two danger areas in contact with each other; and iv) when there are vertexes having no collision points and vertexes having two collision points, the danger area calculation means judging, for the vertexes having two collision points, which one of the two collision points needs a longer time to move from the present vertex's position to the collision point, and which one of the two collision points needs a shorter time to move from the present vertex's position to the collision point, classifying one of the two collision points needing a longer time into a longer time group and the other of the two collision points needing a shorter time into a shorter time group, assuming that, if there are vertexes having one collision point, the collision point belongs to either group, and determining lines such that the own-ship-mapping-positions corresponding to the collision points belonging to the longer time group and corresponding to the vertexes neighboring each other are connected with each other by one of the lines, and determining lines such that the own-ship-mapping-positions corresponding to the collision points belonging to the shorter time group and corresponding to the vertexes neighboring each other are connected with each other by one of the lines, if a neighboring vertex has no collision points, two own-ship-mapping-positions corresponding to the two collision points corresponding to a vertex which neighbors with the vertex having no collision are connected with each other by one of the lines, so that the lines define two danger areas overlapping each other, whereby said apparatus supports ship navigation by providing the danger area where there is the danger of collision between the navigating ship and the target ship.

2. The navigation supporting display apparatus according to claim 1, further comprising display means receiving information on the lines joining the own-ship-mapping-positions and own-ship-mapping-positions from the danger area calculation means, said display means displaying an area defined by the lines joining own-ship-mapping-positions as a danger area together with the position and vector of own ship and the position of the target ship.

3. The navigation supporting display apparatus according to claim 1, wherein at least one of two points of contact of two tangential lines drawn from the target ship to a circle centered at the position of the navigating ship and having a radius corresponding to a safe passing distance is one of the vertexes of the polygonal safe passing region.

4. The navigation supporting display apparatus according to claim 1, further comprising dangerous ship selection means for selecting a dangerous ship from among target ships, wherein said danger area calculation means delivers instructions to the display means to change the display of a danger area according to whether the danger area is related to the dangerous ship.

5. The navigation supporting display apparatus according to claim 1 wherein the danger area calculation means outputs information to the display means such that the danger areas that overlap can be discriminated from other non-overlapping cases.

6. The navigation supporting display apparatus according to claim 1, further comprising dangerous course range calculation means for calculating a dangerous course range to define courses which make the navigating ship pass through the danger area, and dangerous course confirmation means outputting an alarm signal when a course of the navigating ship is set within the dangerous course range.

7. The navigation supporting display apparatus according to claim 1, further comprising dangerous course range calculation means for calculating a dangerous course range to define courses which make the navigating ship pass an area between two separate danger areas related to a target ship, and dangerous course confirmation means outputting an alarm signal when a course of the navigating ship is set within the dangerous course range.

8. The navigation supporting display apparatus according to claim 1, further comprising noticeable region setting means for setting a noticeable region to be used to judge the the risk of a collision, wherein said danger area calculation means delivers instructions to the display means to change the display of a danger area according to whether at least a part of the danger area is located within the noticeable region.

* * * * *

UNITED STATES PATENT AND TRADEMARK OFFICE
CERTIFICATE OF CORRECTION

PATENT NO. : 5,515,287
DATED : May 7, 1996
INVENTOR(S) : Hakoyama et al.

It is certified that error appears in the above-identified patent and that said Letters Patent are hereby corrected as shown below:

In Drawing Sheet:

In Figure 7a of the drawings; reference "Q23" between "Q18" and "Q27" should be -- Q28 --.

Signed and Sealed this

Tenth Day of December, 1996

Attest:

BRUCE LEHMAN

Attesting Officer

Commissioner of Patents and Trademarks